(12) United States Patent
Kim et al.

(10) Patent No.: US 11,803,780 B2
(45) Date of Patent: Oct. 31, 2023

(54) TRAINING ENSEMBLE MODELS TO IMPROVE PERFORMANCE IN THE PRESENCE OF UNRELIABLE BASE CLASSIFIERS

(71) Applicant: Western Digital Technologies, Inc., San Jose, CA (US)

(72) Inventors: Yongjune Kim, San Jose, CA (US); Yuval Cassuto, Sunnyvale, CA (US)

(73) Assignee: Western Digital Technologies, Inc., San Jose, CA (US)

( * ) Notice: Subject to any disclaimer, the term of this patent is extended or adjusted under 35 U.S.C. 154(b) by 569 days.

(21) Appl. No.: 16/889,644

(22) Filed: Jun. 1, 2020

(65) Prior Publication Data
US 2021/0097446 A1  Apr. 1, 2021

Related U.S. Application Data

(60) Provisional application No. 62/907,537, filed on Sep. 27, 2019.

(51) Int. Cl.
*G06N 20/20* (2019.01)
*G06F 16/28* (2019.01)
*G06N 5/01* (2023.01)
*G06N 7/01* (2023.01)

(52) U.S. Cl.
CPC ............ *G06N 20/20* (2019.01); *G06F 16/285* (2019.01); *G06N 5/01* (2023.01); *G06N 7/01* (2023.01)

(58) Field of Classification Search
CPC ............ G06N 20/20; G06N 5/01; G06N 7/01; G06N 3/08; G06N 20/10; G06F 16/285
See application file for complete search history.

(56) References Cited

U.S. PATENT DOCUMENTS

| 9,053,436 | B2* | 6/2015 | Dalessandro | G06N 5/022 |
| 9,607,246 | B2* | 3/2017 | Jebara | G06F 18/2148 |
| 10,438,212 | B1* | 10/2019 | Jilani | G06N 5/025 |
| 2011/0119210 | A1* | 5/2011 | Zhang | G06N 20/00 |
| | | | | 706/12 |
| 2011/0243401 | A1* | 10/2011 | Zabair | G06T 7/246 |
| | | | | 382/128 |
| 2012/0321174 | A1* | 12/2012 | Tsymbal | G06F 16/5866 |
| | | | | 382/159 |
| 2020/0034668 | A1* | 1/2020 | Dutta | G06N 20/20 |

OTHER PUBLICATIONS

Ensemble methods in machine learning T. G. Dietterich (Year: 2000).*
A probabilistic classifier ensemble weighting scheme based on cross-validated accuracy estimates Large et al. (Year: 2019).*
Loss Minimization and Generalizations of Boosting Schapire et al. (Year: 2012).*

(Continued)

*Primary Examiner* — Brian M Smith
*Assistant Examiner* — Ababacar Seck
(74) *Attorney, Agent, or Firm* — PATTERSON + SHERIDAN, LLP; Steven H. VerSteeg

(57) ABSTRACT

A system and method for training base classifiers in a boosting algorithm includes optimally training base classifiers considering an unreliability model, and then using a scheme with an aggregator decoder that reverse-flips inputs using inter-classifier redundancy introduced in training.

24 Claims, 15 Drawing Sheets

(56) References Cited

OTHER PUBLICATIONS

Bootkrajang, Jakramate et al.; "Boosting in the Presence of Label Noise" ArXiv Preprint ArXiv: 1309.6818, Sep. 26, 2013 (10 pages).
Karmaker, Amitava et al.; "A Boosting Approach to Remove Class Label Noise" International Journal of Hybrid Intelligent Systems, pp. 169-177, 2006.
Omari, Adil et al.; "Post-Aggregation of Classifer Ensembles" Elsevier, Information Fusion 26; www.elsevier.com/locate/inffus, pp. 96-102, 2015.
Kim, Yongjune et al.; "Boosting Classifers with Noisy Interence"; ArXiv:1909.04766v1, Sep. 10, 2019 (11 pages).
Long, Philip M. et al.; "Random Classification Noise Defeats All Convex Potential Boosters"; Spinger, Machine Learning, 78, pp. 287-304, 2010.

\* cited by examiner

TRAINING ENSEMBLE MODELS TO IMPROVE PERFORMANCE IN THE PRESENCE OF UNRELIABLE BASE CLASSIFIERS

CROSS-REFERENCE TO RELATED APPLICATIONS

This application claims benefit of U.S. Provisional Patent Application Ser. No. 62/907,537, filed Sep. 27, 2019, the entire contents of which is herein incorporated by reference.

BACKGROUND

This disclosure generally relates to machine learning, and in particular to improved systems and methods for performing distributed classification using ensemble models trained with enhanced boosting methods.

Distributed classification is a type of machine learning method, known more generally as an ensemble method, in which the task of classification is performed jointly by multiple base classifiers whose output is aggregated by an aggregator to make a final classification decision. Distributed classification models may be used, for example, where each distributed base classifier is computationally limited to realizing a simple function of input data.

Unfortunately, the performance of conventional distributed classification models is significantly compromised when the base classifiers are unreliable, which can arise for various reasons. For example, a "straggling" base classifier may fail to deliver its output to an aggregator in time for its output to be used in the aggregated classification task. As another example, an aggregator may receive an output from a base classifier that is erroneously changed, such as an output erroneously flipped from −1 to +1. Notably, in both of these examples, the extrinsic unreliability of a base classifier is distinct from any intrinsic inaccuracy of the base classifier, and thus presents a unique problem for the distributed classification model.

Accordingly, improved method for training and inferencing with ensemble models are needed to account for unreliable base classifiers in such models.

BRIEF SUMMARY

A first aspect provides a method of training a machine learning model, including: determining a probability of an unreliable base classifier output for a plurality of base classifiers of an ensemble model, wherein the probability of an unreliable base classifier output is greater than a threshold value; training the plurality of base classifiers in a sequence of training iterations to minimize an expected loss function, wherein: each training iteration of the sequence of training iterations is associated with one base classifier of the plurality of base classifiers, and the expected loss function accounts for the probability of an unreliable base classifier output; determining a plurality of base classifier weights for the plurality of base classifiers, wherein each base classifier weight of the plurality of base classifier weights is associated with one base classifier of the plurality of base classifiers; and updating the ensemble model with the plurality of base classifier weights.

A second aspect provides a method of training a machine learning model, including: training a plurality of base classifiers of an ensemble model in a sequence of training iterations to minimize an expected loss function, wherein each training iteration of the sequence of training iterations is associated with one base classifier of the plurality of base classifiers; determining a plurality of base classifier weights for the plurality of base classifiers, wherein each base classifier weight of the plurality of base classifier weights is associated with one base classifier of the plurality of base classifiers; training a plurality of redundant base classifiers of the ensemble model based on the plurality of trained base classifiers; determining a plurality of redundant base classifier weights for the plurality of redundant base classifiers, wherein each redundant base classifier weight of the plurality of redundant base classifier weights is associated with one redundant base classifier of the plurality of redundant base classifiers; and updating the ensemble model with the plurality of base classifier weights and the plurality of redundant base classifier weights.

A third aspect provides a method for classifying with a machine learning model, including: receiving at a decoder of an ensemble model an input vector comprising output from a plurality of base classifiers and a redundant base classifier trained based on the plurality of base classifiers; decoding the input vector with the decoder to generate input data for an aggregator of the ensemble model; providing the input data to the aggregator; and generating, by the aggregator, a classification for the input vector based on the input data.

Other aspects provide processing systems configured to perform the aforementioned methods as well as those described herein; non-transitory, computer-readable media comprising instructions that, when executed by one or more processors of a processing system, cause the processing system to perform the aforementioned methods as well as those described herein; a computer program product embodied on a computer readable storage medium comprising code for performing the aforementioned methods as well as those further described herein; and a processing system comprising means for performing the aforementioned methods as well as those further described herein.

Figure 1:
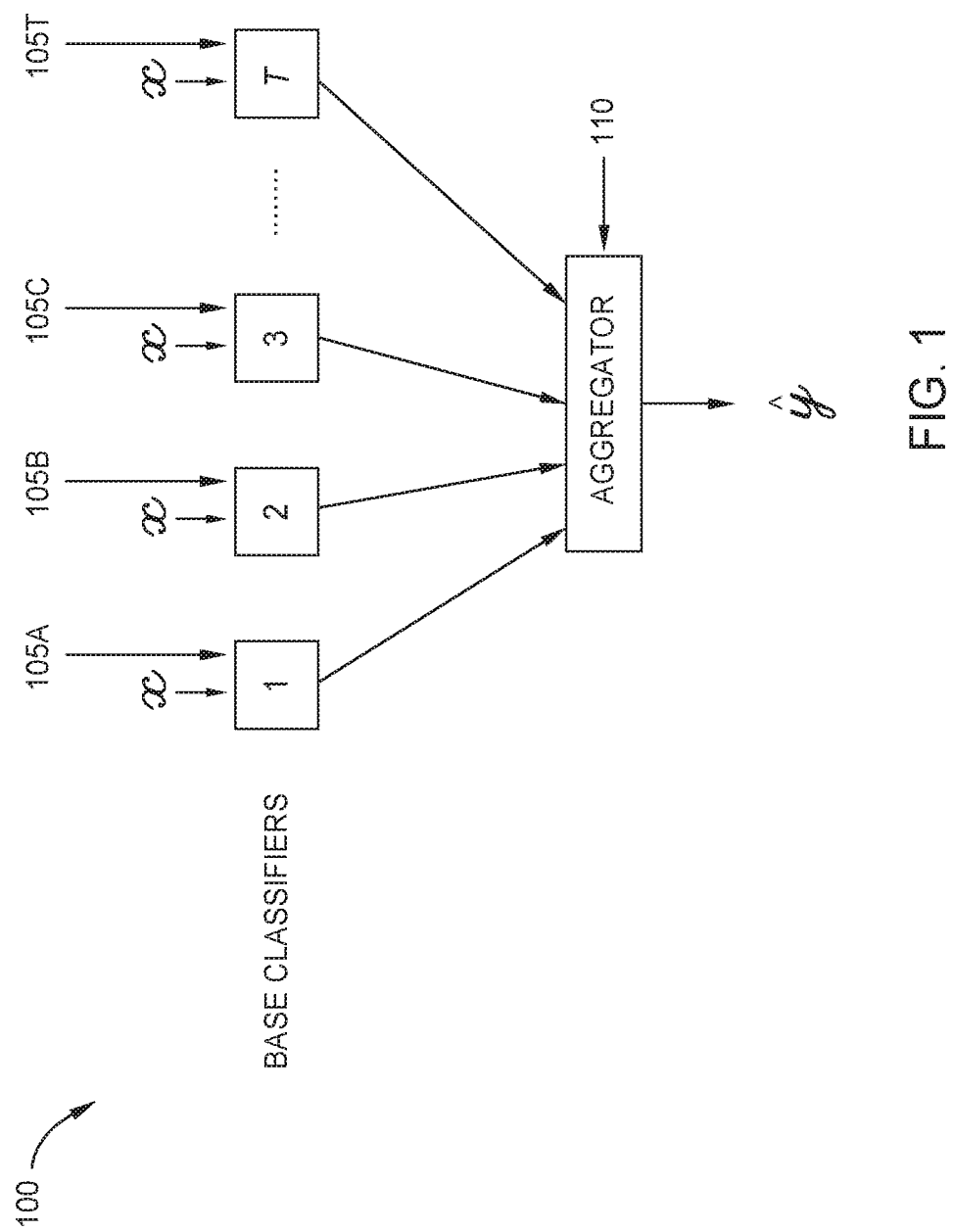
FIG. 1 depicts an example block diagram of an ensemble model, in accordance with some embodiments of the present disclosure.

The foregoing and other features of the present disclosure will become apparent from the following detailed description and appended claims, taken in conjunction with the accompanying drawings. Understanding that these drawings depict only several embodiments in accordance with the disclosure and are therefore, not to be considered limiting of its scope, the disclosure will be described with additional specificity and detail through use of the accompanying drawings. In the drawings, similar symbols typically identify similar components, unless context dictates otherwise.

DETAILED DESCRIPTION

The illustrative embodiments described in the detailed description, drawings, and claims are not meant to be limiting. Other embodiments may be utilized, and other changes may be made, without departing from the spirit or scope of the subject matter presented here. It will be readily understood that the aspects of the present disclosure, as generally described herein, and illustrated in the figures, can be arranged, substituted, combined, and designed in a wide variety of different configurations, all of which are explicitly contemplated and made part of this disclosure.

Overview of Ensemble Methods in Machine Learning, Boosting, and Boosting Enhancements to Address Straggling and Flipping Classifiers Ensemble methods in machine learning distribute a machine learning task (e.g., classification) to an ensemble of base classifiers, and specify how to train the individual base classifiers and how to aggregate the outputs from the base classifiers into an overall model output.

A classifier may generally be a function, a model (or a part of a model), or the like configured to analyze input data and to generate an output, such as a predicted classification of the input data. For example, a classifier may be used to identify the presence of an object in an input image. As another example, a classifier may be used to identify whether an input email message is spam or not. Classifiers may generally be used in a wide variety of applications.

A classifier may be considered a weak classifier (or weak learner) if the classifier is only slightly correlated with the right classification, or in other words, if its classification results are marginally better than random guessing. A classifier may be considered a strong classifier (or strong learner) if that classifier is highly correlated with the right classification, or in other words, if it is able to classify more accurately than a weak classifier.

FIG. 1 depicts an example block diagram of an ensemble model 100, in accordance with some embodiments of the present disclosure. Ensemble model 100 may be used, for example, for performing distributed classification.

In this example, ensemble model 100 includes T computationally-limited base classifiers (or base nodes) 105A-105T and an aggregator (or aggregator node) 110. To classify an input data vector, x, each of the base classifiers 105A-105T processes data vector, x, and sends its output to the aggregator 110 through a point-to-point channel. In some embodiments, the output of each of the base classifier 105A-105T may be a binary output, such as $\{-1, 1\}$. Further, in some embodiments, such as the one depicted in FIG. 1, there is no communication among the base nodes 105A-105T themselves.

Aggregator 110 combines the outputs from the base classifiers 105A-105T into a final classification output 9. The final classification output may likewise be a binary output, such as $\{-1, 1\}$. In some embodiments, the aggregator 110 may implement a linear combination function, such as described further below with respect to FIG. 2.

"Boosting" generally refers to an ensemble machine learning method that converts a plurality of weak base classifiers in an ensemble model into a stronger, aggregated classifier. Boosting may include assigning an initial weight (and bias in some cases) to a plurality of weak base classifiers and then adjusting the initial weights through training, which "boosts" the classification performance of the ensemble model.

There are many types of boosting algorithms, including, for example, Adaptive Boosting ("Adaboost"), LogitBoost, and BrownBoost, to name just a few. With Adaboost, base classifiers are iteratively tested on a set of training data and incorrect classifications at a base classifier are given a greater weight for testing with another base classifier. Along with weights, each base classifier may also use a bias value that influences its output value. By iteratively testing base classifiers and adjusting the weight and bias values based on the error of overall classification, Adaboost generates a more accurate ensemble model.

Boosting methods thus improve the accuracy of an ensemble model by accounting for intrinsic weaknesses of its base classifiers. Unfortunately, such methods do not account for various extrinsic weaknesses with an ensemble model's base classifiers.

For example, a "straggling" base classifier generally fails to get its output to an aggregator in a manner that the aggregator can use it. For example, a straggling base classifier may fail to get its output to an aggregator in time for the aggregator to combine it with the individual results of other base classifiers and to make an overall classification. As another example, a straggling classifier's output may be delayed, corrupted, or stopped completely in transit to an aggregator. Straggling may be caused by, for example, communication issues between a base classifier and a remotely located aggregator, as is often the case with distributed sensor systems. Because the training of an ensemble model generally assumes the output of each base classifier will be aggregated, straggling base classifiers can negatively impact the overall performance of an ensemble model.

Even when a base classifiers delivers its output to an aggregator, the actual value that is delivered may not be the original or intended output value of the base classifier. For example, a base classifier's output may be changed relative to its original value based on an error in the transmission or reception of its output. In the case of base classifier that generates a binary output (e.g., {−1, 1}, {0, 1}, etc.), a changed output value (e.g., from −1 to 1) may be referred to as a "flipped" output value, and the base classifier may be referred to as a flipping base classifier.

For example, returning to FIG. 1, in some cases, base classifiers 105A-105T or their links to aggregator 110 may be unreliable, such that the inputs received at aggregator 110 may differ from the outputs transmitted by base classifiers 105A-105T. For example, in some cases, the unreliability in output from base classifiers 105A-105T may be due to straggling and flipping.

More specifically with respect to FIG. 1, if an output from the tth base classifier of base classifiers 105A-105T is $y_t(x) \in \{+1, -1\}$ and $\tilde{y}_t(x)$ is the value received by the aggregator 110 from the tth base classifier, then in a non-straggling base classifier: $\tilde{y}_t(x) = y_t(x)$. However, in a straggling base classifier, $\tilde{y}_t(x) = 0$. In some cases, each base classifier, $t \in \{1, \ldots, T\}$ straggles with a probability, $\eta$, independent from other base classifiers.

In the case of a flipping base classifier, the output from the tth base classifier of base classifier 105A-105T is flipped or reversed from the value the base classifier was designed to output. For example, where is $y_t(x) \in \{+1, -1\}$, in a non-flipped base classifier: $\tilde{y}_t(x) = y_t(x)$, while in a flipped base classifier: $\tilde{y}_t(x) = -y_t(x)$. Further, each base classifier, $t \in \{1, \ldots, T\}$ may flip with probability ε, independent from other base classifiers.

One method for counteracting the impact of straggling or flipping base classifiers is to use error correcting codes ("ECC") on the outputs of the base classifiers. However, using ECC encoding on the base classifier outputs requires that either the base classifiers compute multiple outputs, thereby potentially exceeding their computational capabilities, or that the base classifiers send their outputs to intermediate nodes, thereby violating a flat network structure and adding latency. Thus, a new solution is needed to counteract the impact of straggling or flipping base classifiers. The present disclosure provides solutions for straggling and flipping base classifiers, which may be implemented during training of the base classifiers and during inferencing with the base classifiers.

Specifically, the present disclosure provides an enhanced method of adaptive boosting that accounts for straggling base classifiers in which base classifiers weights are optimized based on the presence of base classifiers that straggle, which may be referred to as "stragboosting" or a "stragboost method". By optimizing the base classifiers in this way, the effectiveness of adaptive boosting is significantly improved compared to conventional methods, such as Adaboost. Moreover, stragboosting allows the same linear combining at an aggregator as conventional ensemble models trained with adaptive boosting, which means that overall model architecture need not be changed for stragboosting.

Further, the present disclosure provides another enhanced method for adaptive boosting that accounts for base classifier outputs suspected to have been changed (e.g., flipped) prior to reaching an aggregator, which may be referred to as "flipboosting" or a "flipboost method". Flipboosting provides a further enhancement to adaptive boosting sequence in which sets of base classifiers (e.g., sets of three or "triples") are trained to detect changed base classifier outputs. Further, a decoder may be implemented by an aggregator and configured to change outputs from the base classifiers when the aggregator predicts the outputs to have been changed (or "flipped") erroneously when sets of base classifiers disagree in their output. Flipboosting thus further improves the effectiveness of adaptive boosting compared to conventional methods, such as Adaboost.

Notably, while the present disclosure is generally described using the Adaboost algorithm as a reference point and example, aspects described herein may be used in conjunction with other boosting techniques or ensemble machine learning algorithms with similar benefits in performance.

Example Ensemble Model Processing System

Figure 2:
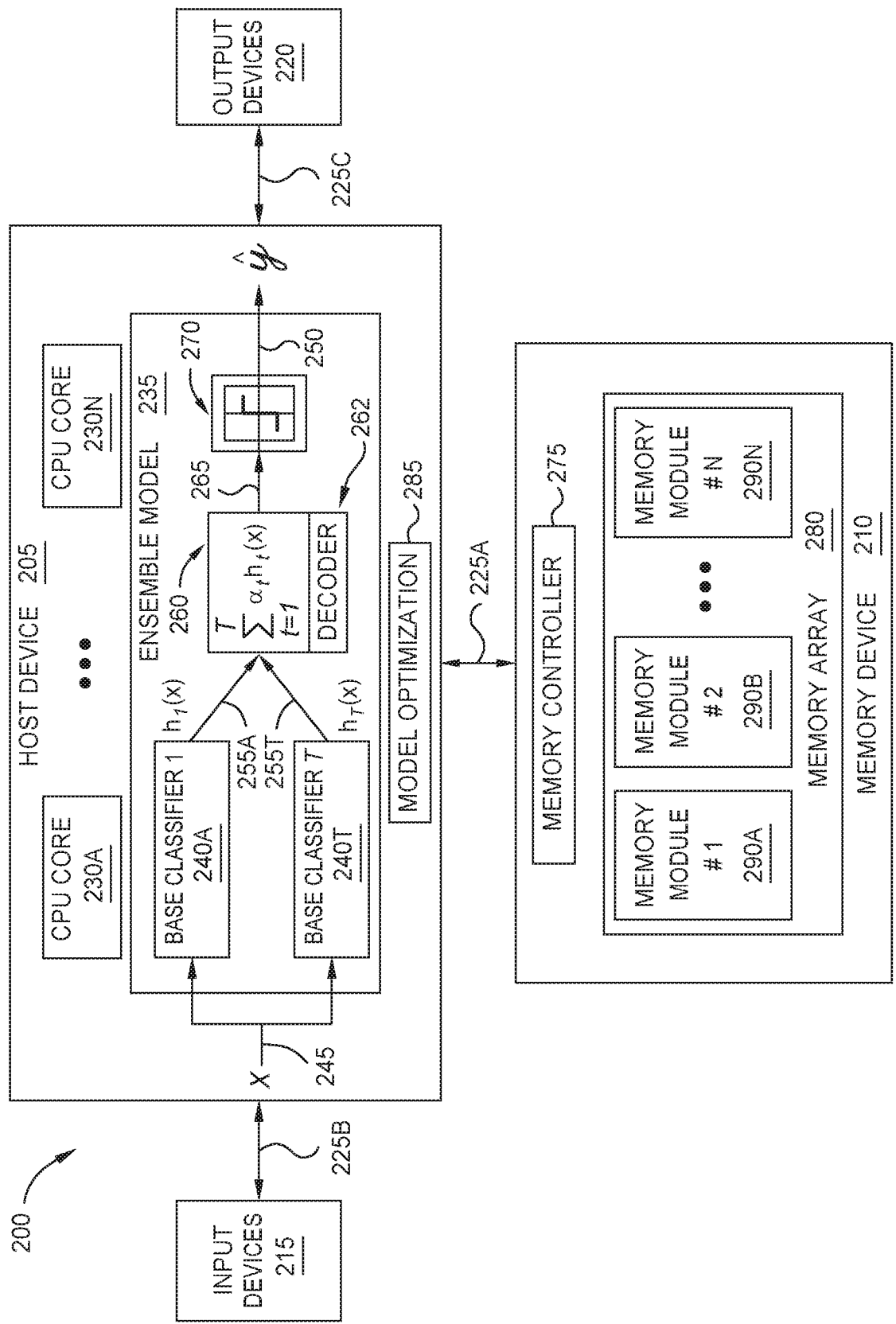
FIG. 2 depicts an example block diagram of a computing system implementing an ensemble model, in accordance with some embodiments of the disclosure.

FIG. 2 depicts an example block diagram of a computing system 200 implementing an ensemble model, in accordance with some embodiments of the disclosure. Computing system 200 may generally be implemented in or representative of a variety of computing devices, such as computers (e.g., desktop, laptop, servers, data centers, etc.), tablets, personal digital assistants, mobile devices, wearable computing devices such as smart watches, other handheld or portable devices, or any other type of processing system.

The computing system 200 includes a host device 205 associated with a memory device 210. The host device 205 is configured to receive input from one or more input devices 215 and provide output to one or more output devices 220. The host device 205 is further configured to communicate with the memory device 210, the input devices 215, and the output devices 220 via appropriate interfaces 225A, 225B, and 225C, respectively.

The input devices 215 may include any of a variety of input technologies such as a keyboard, stylus, touch screen, mouse, track ball, keypad, microphone, voice recognition, motion recognition, remote controllers, input ports, one or more buttons, dials, joysticks, and any other input peripheral that is associated with the host device 205 and that allows an external source, such as a user, to enter information (e.g., data) into the host device and send instructions to the host device. In some embodiments, input devices 215 may include other computing devices.

Similarly, the output devices 220 may include a variety of output technologies such as external memories, printers, speakers, displays, microphones, light emitting diodes, headphones, plotters, speech generating devices, video devices, global positioning systems, and any other output peripherals that are configured to receive information (e.g., data) from the host device 205. In some embodiments, output devices 225 may include other computing devices.

The "data" that is either input into the host device 205 and/or output from the host device may include any of a variety of textual data, graphical data, video data, sound data, position data, combinations thereof, or other types of analog and/or digital data that is suitable for processing by computing system 200.

In this embodiment, host device 205 includes one or more processing units/processors, such as central processing unit ("CPU") cores 230A-230N. Each of the CPU cores 230A-230N may be configured to execute instructions for running one or more applications of the host device 205. In some embodiments, the instructions and data needed to run the one or more applications may be stored within the memory device 210. The host device 205 may also be configured to store the results of running the one or more applications within the memory device 210. Thus, the host device 205 may be configured to request the memory device 210 to perform a variety of operations. For example, the host device 205 may request the memory device 210 to read data, write data, update or delete data, and/or perform other operations.

In some embodiments, host device 205 may be configured to control additional processing units, which are not depicted in this example, such as graphics processing units (GPUs), digital signal processors (DSPs), machine learning-enhanced processing units, such as inference or training accelerators, and the like. Further, host device 205 may be configured to control additional processing units that are not physically collocated with host device 205, such as remote or cloud processing capabilities. FIG. 2 is depicted with only certain aspects for simplicity of discussion.

Host device 205 may be configured to implement various machine learning methods, including training of machine learning models and inferencing with machine learning models. For example, host device 205 may be configured to perform training and inferencing with an ensemble machine learning model, such as ensemble model 235, including training using the various boosting methods described herein. For example, the host device 205 may implement a boosting method by executing instructions for the boosting method in one or more of the CPU cores 230A-230N. In some embodiments, model optimization component 285 may be configured to perform training methods on ensemble model 235.

As discussed generally above, a boosting method may be used to train a plurality of base classifiers (e.g., 240A-240T) in a linear combination to obtain a single (or aggregated) result that is overall more accurate than the individual results of the base classifiers. Thus, after "boosting", ensemble model 235 is a better classifier than any of the base classifiers 240A-240T individually.

After training, ensemble model 235 may be used to process input data 245 and to generate an output 250. In particular, input data 245 may be provided as input to each of the base classifiers 240A-240T, which may be any of a type of classifier suitable for use with the ensemble model 235. For example, in some embodiments, one or more of the base classifiers 240A-240T may be decision tree classifiers (e.g., decision stumps), single layer classifiers such as single layer neural networks (e.g., perceptrons) or support vector machines, multiple layer classifiers, such as deep neural networks, and others. In other embodiments, other or additional types of base classifiers may be used for the base classifiers 240A-240T. Further, in some embodiments, each of the base classifiers 240A-240T may be the same type of base classifier, while in other embodiments, at least some of the base classifiers may be of different types of classifiers.

Each of the base classifiers 240A-240T receives the input data 245 and generates intermediate results 255A-255T, respectively. For example, the intermediate result 255A of the base classifier 240A may be computed as the product of the input data 245 and a weight value $\alpha_A$ assigned to the base classifier 240A. Similarly, the intermediate results 255B-255T may be computed and input into aggregator node 260 for summation according to the linear combination function.

The intermediate results 255A-255T may be combined by aggregator 260, which in this example is configured to implement a linear combination function configured to obtain a second intermediate result 265 according to $\Sigma_{t=1}^{T} \alpha_t h_t(x)$, where x is the input data 245, $\alpha_t$ is a non-negative coefficient, and $h_t(x) \in \{+1, -1\}$. Thus, in this example, the second intermediate result 265 is a summation of each of the intermediate results 255A-255T.

In this example, the second intermediate result 265 is input into a sign function block 270 that is configured to implement a mathematical function that extracts the sign of a real number. Specifically, the sign function block 270 may implement the following mathematical function to obtain the output 250: $\hat{y}=\text{sign}(\Sigma_{t=1}^{T} \alpha_t h_t(x))$, where: $\hat{y}$ is the output 250 and $\Sigma_{t=1}^{T} \alpha_t y_t(x)$ is the second intermediate result 265. Note that the sign function is this example need not be used in all embodiments. Further, the sign function block 270 may be a function of aggregator 260, though it is shown separately in this example for clarity.

Thus, ensemble model 235 aggregates the results of the base classifiers 240A-240T to obtain the model output 250.

Each round or cycle of processing the input data 245 by ensemble model 235 to obtain the output 250 is referred to herein as a workload. For example, the processing of first input data (e.g., the input data 245) to receive first output (e.g., the output 250) is a first workload, the processing of second input data to receive second output is a second workload, etc.

In some cases, the input data 245 may be received from the input devices 215 via the interface 225B, and the output 250 may be sent to the output devices 220 via the interface 225C. In other cases, the input data 245 may be received from memory device 210, and the output may be sent to memory device 210, e.g., for storage in non-volatile memory array 280, where it may be used by other aspects of host device 205, such an application running on host device 205.

Host device 205 further includes a model optimization component 285 configured to train and improve the accuracy of ensemble model 235. For example, as described further herein, optimization component 285 may be configured to perform stragboosting that accounts for straggling base classifiers, such any of base classifiers 240A-240T in this example. Further, optimization component 285 may be configured to perform flipboosting to introduce inter-classifier dependence, which enables decoder 262 to detect and correct changed (e.g., flipped) intermediate results (e.g., 255A-255T), which are inputs to aggregator 260.

In some embodiments, optimization component 285 may be implemented as a logic circuit in either software, hardware, firmware, or combination thereof to perform the functions described herein. While depicted as an aspect of host device 205 in FIG. 2, in other embodiments model optimization component 285 may be implemented in a remote processing system and ensemble model 235 may be deployed to host device 205 after training on the remote processing devices.

In some embodiments, decoder 262 is implemented as part of aggregator 260, while in other embodiments, decoder 262 may be implemented separate from decoder 260, but as part of ensemble model 235. In yet further embodiments, decoder 262 may be implemented separate from ensemble model 235, but configured to interface with ensemble model 235.

Referring still to FIG. 2, memory device 210 includes a memory controller 275 that is configured to read data from or write data to a memory array 280. The memory array 280 may include one or more memory modules such as memory modules 290A-290N. Each of the memory modules 290A-290N may include any of a variety of volatile and/or non-volatile memory types.

For example, in some embodiments, one or more of the memory modules 290A-290N or portions thereof may include NAND flash memory cores. In other embodiments, one or more of the memory modules 290A-290N or portions thereof may include NOR flash memory cores, Static Random Access Memory (SRAM) cores, Dynamic Random Access Memory (DRAM) cores, Magnetoresistive Random Access Memory (MRAM) cores, Phase Change Memory (PCM) cores, Resistive Random Access Memory (ReRAM) cores, 3D XPoint memory cores, ferroelectric random-access memory (FeRAM) cores, and other types of memory cores that are suitable for use within the memory array 280. In some embodiments, one or more of the memory modules 290A-290N or portions thereof may be configured as other types of storage class memory ("SCM"). Further, each of the memory modules 290A-290N may be implemented as a single in-line memory module or a dual in-line memory module.

The memory modules 290A-290N may be individually and independently controlled by the memory controller 275. In other words, the memory controller 275 may be configured to communicate with each of the memory modules 290A-290N individually and independently. By communicating with the memory modules 290A-290N, the memory controller 275 may be configured to read data from or write data to one or more of the memory modules in response to instructions received from the host device 205. The memory controller 275 and the optimization processor 285 may be situated on the same die as the memory array 280 or on a different die. Although shown as being part of the memory device 210, in some embodiments, the memory controller 275 may be part of the host device 205 or part of another component of the computing system 200 and associated with the memory device. The memory controller 275 may be implemented as a logic circuit in either software, hardware, firmware, or combination thereof to perform the functions described herein. For example, in some embodiments, the memory controller 275 may be configured to execute computer-readable instructions stored in the memory device 210. In some embodiments, the memory controller 275 may be integrated into a single processor or controller.

To facilitate execution of ensemble model 235, the memory controller 275 may reserve space in the memory modules 290A-290N for each of the base classifiers 240A-240T. The reserved memory space serves as a dedicated memory or dedicated computational resource for the base classifiers 240A-240T for the duration of the computation in the base classifiers. Once the computation in the base classifiers 240A-240T is complete, the reserved memory space is released for use by the next workload. Similarly, memory controller 275 may reserve space in the memory modules 290A-290N for the functions of aggregator node 260 and sign function block 270.

It is to be understood that only some components of the computing system 200 are shown and described in FIG. 2. However, the computing system 200 may include other components such as various batteries and power sources, networking interfaces, routers, switches, external memory systems, controllers, etc. Generally speaking, the computing system 200 may include any of a variety of hardware, software, and/or firmware components that are needed or considered desirable in performing the functions described herein. Similarly, the host device 205, the input devices 215, the output devices 220, and the memory device 210 including the memory controller 275, the memory array 280, and optimization component 285 may include other hardware, software, and/or firmware components that are considered necessary or desirable in performing the functions described herein. In addition, in certain embodiments, the memory device 210 may integrate some or all of the components of the host device, including, for example, the CPU cores 230A-230N (or their equivalents or substitutes such as GPUs or accelerators as described above), and the CPU cores may implement the ensemble model 235, as described above.

Adaptive Boosting

Consider a training dataset, $D=\{(x_1, y_1), \ldots, (x_m, y_m)\}$ where each $x_i$ is a data vector and each $y_i$ is a binary label in $\{-1, 1\}$. A pair $(x_i, y_i)$ in dataset D may be referred to as a data point.

In conventional adaptive boosting (e.g., Adaboost), a base classifier $h(\cdot)$ maps x to a binary label $y \in \{-1, 1\}$. The base classifier $h(\cdot)$ may be trained to minimize an empirical risk $R_{D,W}(h)$ on the training dataset D whose data points are weighted according to some $W=(w_i)_{i=1}^m$: $\Sigma_{i=1}^m w_i = 1$ according to:

$$R_{D,W}(h) = \sum_{i=1}^{m} w_i I(h(x_i) \neq y_i), \tag{1}$$

where I(e) is an indicator function that evaluates to 1 when event e occurs and to 0 otherwise.

The Adaboost algorithm uses the dataset, D to train a combined classifier of the form $H(x)=\text{sign}(\Sigma_{t=1}^{T} \alpha_t h_t(x))$, where each $h_t(\cdot)$, $t \in \{1, \ldots, T\}$, is the output from a base node (e.g., the base nodes 240A-240T). Thus, for $t \in \{1, \ldots, T\}$, $h_t(\cdot)$ is trained to minimize:

$$\sum_{i=1}^{m} w_i^{(t)} I(h_t(x_i) \neq y_i), \tag{2}$$

where:

$$w_i^{(t>1)} \triangleq \prod_{j=1}^{t-1} [\exp\{-y_i \alpha_j h_j(x_i)\}], \ w_i^{(1)} \triangleq 1 \tag{3}$$

Then classifier weights, $\alpha_t$, may be set as:

$$\alpha_t = \frac{1}{2} \ln\left( \frac{\Sigma_{i=1}^{m} w_i^{(t)} I(h_t(x_i) = y_i)}{\Sigma_{i=1}^{m} w_i^{(t)} I(h_t(x_i) \neq y_i)} \right) \tag{4}$$

Classification by the aggregator (e.g., function 260 in FIG. 2) may be given by:

$$\hat{y} = \text{sign}\left( \sum_{t=1}^{T} \alpha_t h_t(x) \right) \tag{5}$$

Equations (2)-(4) thus represent a conventional Adaboost training algorithm for base classifiers performed on a training dataset $(x_1, y_1), \ldots, (x_m, y_m)$, and Equation (5) represents the combination of the outputs of the base classifiers invoked on a test data vector x. It is to be understood that the data weights (given in Equation (3)) are used in training and the classifier weights (given in Equation (4)) are computed in training and used in classification by the aggregator.

At each iteration of training a base classifier, $h_t$, using Equations (2)-(4) above, the data weights $w_i^{(t)}$ and classifier weights of $\alpha_t$ of $h_t$ may be adjusted to minimize the exponential loss according to: $\sum_{i=1}^{m} \exp\{-y_i \sum_{j=1}^{T} \alpha_j h_j(x_i)\}$ given the classifiers $h_1, \ldots, h_{t-1}$ and their weights $\alpha_1, \ldots, \alpha_{t-1}$ found in previous iterations.

Since a straggling base classifier straggles with probability $\eta$, independently from other classifiers, $\tilde{H}(x)=\text{sign}(\sum_{y=1}^{T} \alpha_t \tilde{h}_t(x))$ where $\tilde{h}_t(x)=h_t(x)$ with probability $1-\eta$ and $\tilde{h}_t(x)=0$ with probability $\eta$. Thus, the effect of straggling base classifiers may be that the combined classification output is obtained by only part of the trained base classifiers, while the straggling base classifiers contribute a "neutral" 0 to the weighted sum at the aggregator.

Enhancing Adaptive Boosting for Straggling Base Classifiers Using Stragboosting

To mitigate the potential degradation of performance from straggling base classifiers, the adaptive boosting training procedure in Equations (2)-(4) may be enhanced to account for straggling base classifiers. Notably, at training time, the identities of straggling base classifiers are not known. In fact, the identities may change between classification instances. Thus, it can only be assumed that the straggling probability, $\eta$, is known at training time.

Accordingly, for a set S of base classifiers, a subset $A \subseteq S$ defines a partition of S non-straggling base classifiers in A and straggling base classifiers in $S \backslash A$. The probability that $(A, S \backslash A)$ is the partition of S to non-straggling and straggling base classifiers is denoted $P_\eta(A)$. Let $|X|$ denote the size of the set X. Then, for an independently and identically distributed straggling model, the following may be expressed:

$$P_\eta(A) = (1-\eta)^{|A|} \cdot \eta^{|S|-|A|} \quad (6)$$

Stragboosting improves upon conventional adaptive boosting by training the base classifiers, $h_t(\bullet)$, taking into account that they straggle independently and identically with probability $\eta$, instead of ignoring the outputs of the straggling base classifiers by taking their output values as 0's.

Recall that Adaboost training performs a sequential minimization of an exponential loss function, that is, looking for $h_t$ and $\alpha_t$ that minimize:

$$E = \sum_{i=1}^{m} \exp\{-y_i h_t(x_i)\} = \sum_{i=1}^{m} \prod_{j=1}^{t} \exp\{-y_i \alpha_j h_j(x_i)\}, \quad (7)$$

where $H_t(x) \triangleq \sum_{j=1}^{t} \alpha_j h_j(x)$ and $\{h_j, \alpha_j\}_{j=1}^{t-1}$ is known from previous iterations. Assuming no stragglers in the base classifiers (e.g., 240A-205T in FIG. 2), the exponential loss function may be rewritten as:

$$E = \sum_{i=1}^{m} \exp\{-y_i H_{t-1}(x_i)\} \exp\{-y_i \alpha_t h_t(x_i)\} \quad (8)$$

Thus, only the second exponent may be minimized. However, for the base classifiers that are stragglers, $H_t(\bullet)$ may be replaced by $\tilde{H}_t(\bullet) \triangleq \text{sign}(\sum_{j=1}^{t} \alpha_j \tilde{h}_j(x))$ in Equation (7), and the latter is not deterministically known at training time. So instead, the expected exponential loss function may be minimized according to:

$$E = \sum_{i=1}^{m} \sum_{A \subseteq [1,t]} P_\eta(A) \prod_{\substack{j=1 \\ j \in A}}^{t} \exp\{-y_i \alpha_j h_j(x_i)\}, \quad (9)$$

where the expectation is taken as a sum over all subsets $A \subseteq [1, t]$ of non-straggling base classifiers. From the independent and identically distributed decomposition of $P_\eta(A)$ in Equation (6) and using the distributive law, the following expression is obtained:

$$E = \sum_{i=1}^{m} \prod_{j=1}^{t} [(1-\eta) \exp\{-y_i \alpha_j h_j(x_i)\} + \eta] \quad (10)$$

The product of Equation (10) may be split to a term $w_i(t)$ already known from previous iterations and a term to be optimized in this iteration according to:

$$E = \sum_{i=1}^{m} w_i^{(t)} \cdot [(1-\eta) \exp\{-y_i \alpha_t h_t(x_i)\} + \eta] \quad (11)$$

Based on this derivation, an improved method of adaptive boosting (stragboost) may be used to successively minimize the expected exponential loss function $\overline{E}$ in the presence of straggling base classifiers.

In one embodiment, stragboosting is implemented for an ensemble model with straggling base classifiers (e.g., a "straggling model") as follows. First, train $h_t(\bullet)$ for $t = \{1, \ldots, T\}$ to minimize:

$$\sum_{i=1}^{m} w_i^{(t)} I(h_t(x_i) \neq y_i), \quad (12)$$

where:

$$w_i^{(t>1)} \triangleq \prod_{j=1}^{t-1} [(1-\eta) \exp\{-y_i \alpha_j h_j(x_i)\} + \eta], w_i^{(1)} \triangleq \frac{1}{m}. \quad (13)$$

Second, set $$\alpha_t = \frac{1}{2} \ln \left( \frac{\sum_{i=1}^{m} w_i^{(t)} I(h_t(x_i) = y_i)}{\sum_{i=1}^{m} w_i^{(t)} I(h_t(x_i) \neq y_i)} \right). \quad (14)$$

Then classification by an aggregator (e.g., aggregator node 260 in FIG. 2), given the set $A \subseteq [1, T]$ of non-straggling classifiers, may be given by:

$$\hat{y} = \text{sign}\left(\sum_{\substack{t=1 \\ t \in A}}^{T} \alpha_t h_t(x)\right). \quad (15)$$

The difference between Equation (15) for a stragboosted ensemble model and an ensemble model trained with conventional Adaboost is that the data-weighting function may change from a plain product of exponents in Equation (3) to the η-dependent function in Equation (13). Other than using a different data-weighting function to train $h_t$, Equation (15) may follow the same or substantially similar steps as the Adaboost algorithm to similarly attain exponential-loss optimality for the expected exponential loss.

For straggling base classifiers, at each iteration of training and classifying the output of a base node, t, using Equations (12)-(15) above, the data weights $w_i^{(t)}$ and classifier weight $\alpha_t$ of $h_t$ minimize the expected exponential loss:

$$E \triangleq \sum_{A \subseteq [1,t]} P_\eta(A) \sum_{i=1}^m \exp\left\{-y_i \sum_{\substack{j=1 \\ j \in A}}^t \alpha_j h_j(x_i)\right\}, \quad (15)$$

given the classifiers $h_1, \ldots, h_{t-1}$ and their weights $\alpha_1, \ldots, \alpha_{t-1}$ found in previous iterations.

Extracting from Equation (11) only the term that depends on the $h_t$ and $\alpha_t$, $(1-\eta) \sum_{i=1}^m w_i^{(t) \cdot exp\{-y_i \alpha_t h_t(x_i)\}}$ is minimized, which reduces to training $h_t$ with the weights $w_i^{(t)}$ of Equation (13) and setting $\alpha_t$ by Equation (14).

Thus, the presence of straggling base classifiers may change the weighting of the data points during training using Equation (13), but may leave unchanged the formula that computes the classifier weights in Equation (14). Although there is no change in the formula, the final weights $\{\alpha_t\}_{t=1}^T$ should differ from conventional Adaboost's weights because they depend on different classifiers and different data weights.

Re-Weighting Non-Straggling Classifiers

In conventional Adaboost optimization, the classifiers $\{h_t\}_{t=1}^T$ and their classification weights $\{\alpha_t\}_{t=1}^T$ are optimized sequentially in lockstep, such as by: $h_1, \alpha_1; h_2, \alpha_2; \ldots; h_t, \alpha_t$. In Equations (12)-(15), the lockstep structure may be maintained when minimizing the expectation of the loss function. However, with straggling base classifiers, it may be beneficial to depart from the lockstep structure and separate the classifier training from the classifier weighting. While the identities of the straggling base classifiers are not known at training time, these identities may become available at classification time when the classifier weights are used. Thus, the boosting algorithm may be further enhanced as follows using a re-weighted stragboosting.

Initially, let $\{h_t\}_{t=1}^T$ be the classifiers trained in the stragboost method described above. Given a subset $A \subseteq [1, T]$ of non-straggling base nodes, and for $t \in A$ given in increasing order $t_1, t_2, \ldots$, then set:

$$v_i^{(t>t_1)} \triangleq \prod_{\substack{j<t \\ j \in A}} \exp\{-y_i \beta_j h_j(x_i)\}, \; v_i^{(t_1)} \triangleq 1, \quad (16)$$

and $$\beta_t \triangleq \frac{1}{2} \ln\left(\frac{\sum_{i=1}^m v_i^{(t)} I(h_t(x_i) = y_i)}{\sum_{i=1}^m v_i^{(t)} I(h_t(x_i) \neq y_i)}\right). \quad (17)$$

Then classification by an aggregator (e.g. aggregator node 260 in FIG. 2), given the set $A \subseteq [1, T]$ of non-straggling classifiers, is given by:

$$\hat{y} = \text{sign}\left(\sum_{\substack{t=1 \\ t \in A}}^T \beta_t h_t(x)\right). \quad (18)$$

In Equations (16)-(18), the base nodes, $h_t$, are trained using the data weights $w_i^{(t)}$ in Equations (12)-(15), but different data weights $v_i^{(t))}$ may be used to calculate a new weight $\beta_t$ for the base classifier depending on the instantaneous set A. $\beta_t$ in Equation (17) minimizes the exponential loss function of the weighted base classifier according to $$\sum_{\substack{j \leq t \\ j \in A}} \beta_j h_j(x).$$

By combining Equations (12)-(15) and (16)-(18), $h_t$ minimizes the expected (averaged over all A) exponential loss function, and $\beta_t$ minimizes the instance (per specific A) exponential loss function given $\{h_j\}_{j=1}^t$.

Notably, training base classifiers, such as base classifiers 240A-240T in FIG. 2, using enhanced adaptive boosting methods (e.g., stragboosting with and without reweighting non-straggling classifiers) described herein does not impact the standard operation of an aggregator in an ensemble model, such as aggregator 260 in FIG. 2. Thus, in the example of FIG. 2, aggregator 260 may still implement the linear combination function and the sign function 270 as described above.

Figure 3:
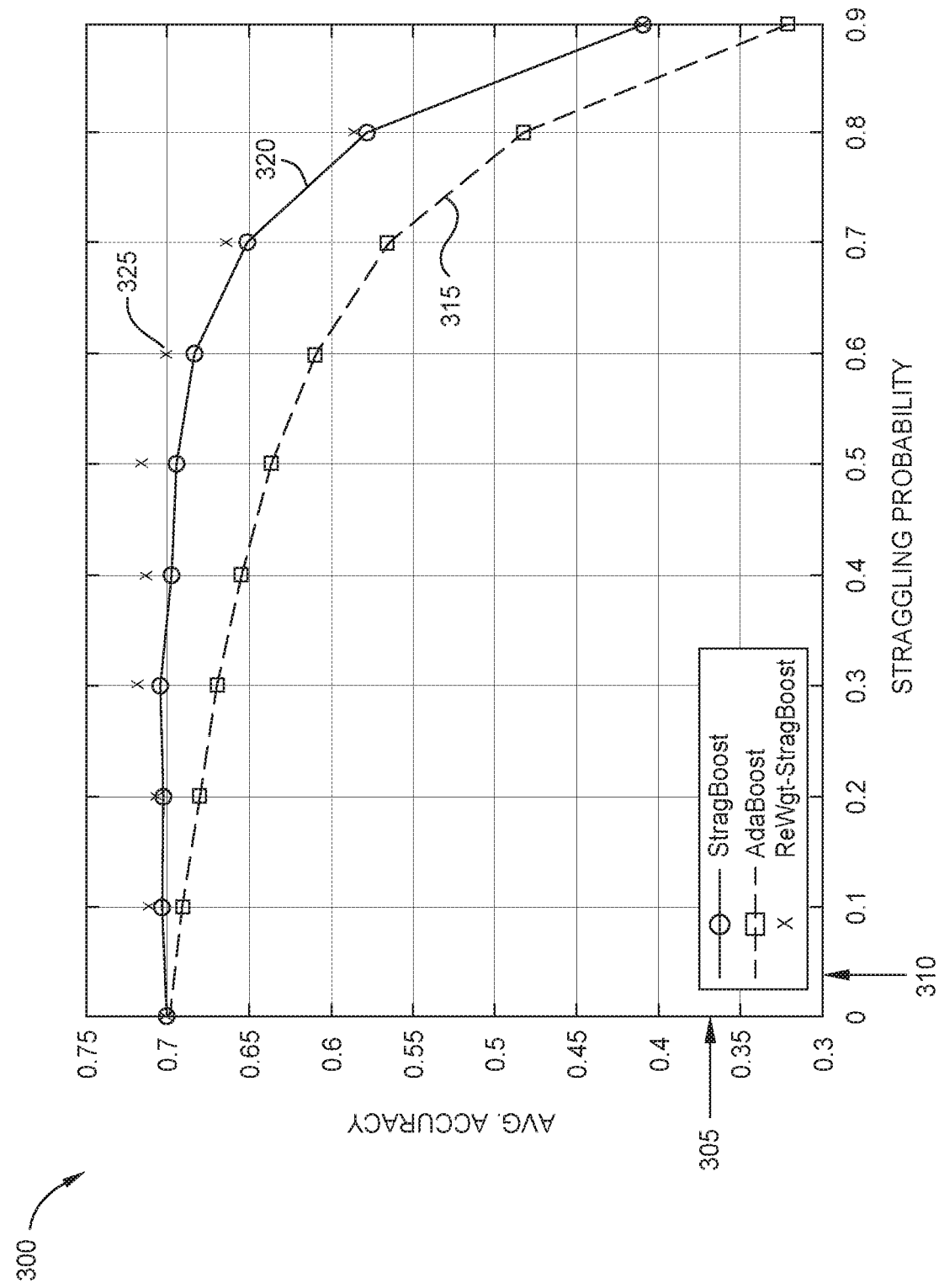
FIG. 3 depicts an example graph showing ensemble model performance improvements from enhanced adaptive boosting for straggling base classifiers (i.e., stragboosting), in accordance with some embodiments of the present disclosure.

Example Performance Improvements from Enhanced Adaptive Boosting for Straggling Base Classifiers FIG. 3 depicts an example graph 300 showing ensemble model performance improvements from enhanced adaptive boosting for straggling base classifiers (i.e., stragboosting).

In particular, graph 300 plots average accuracy results obtained using an ensemble model on Y-axis 305 as a function of probability of a base classifier straggling (η) on X-axis 310.

To obtain the results of the graph 300, a test dataset was used to compare the results of conventional adaptive boosting (line 315) with stragboosting (line 320), and stragboosting with non-straggling classifier re-weighting (line 325).

Average accuracy, as shown on the graph 300, is defined as the fraction of test data points that were correctly classified, averaging over 25,000 drawings of the set $A \subseteq [1, T]$ partitioning $[1, T]$ to non-straggling/straggling base classifiers.

As seen in graph 300, stragboosting (line 320) improves performance significantly and generates better resilience to straggling classifiers over conventional Adaboost (line 315). Further, stragboosting with re-weighting of non-straggling classifiers (line 325), as in Equations (16)-(18), shows an additional improvement compared to stragboosting (line 320) alone. This is because the η parameter used in stragboosting effectively "slows down" the adaptation of the data weights $w_i^{(t)}$ (e.g., see Equation (11)), which adds an inter-classifier redundancy found useful when some base classifiers are missing.

Enhancing Adaptive Boosting for Flipping Base Classifiers with Flipboosting

Flipping base classifiers (e.g., one or more of base classifiers 240A-240T in FIG. 2) may pose a more serious hindrance to accurate classification than straggling base classifiers because flipping base classifiers silently contaminate the combined output (e.g., by aggregator node 260 in FIG. 2) with false inputs.

As discussed above, a flipping base classifier may be given as follows:

$$\tilde{h}(x) = h_t(x) \qquad (19)$$

In an ensemble model with flipping base classifiers (e.g., a "flipping model"), it may be assumed that at classification time, a base classifiers flips with probability ε<0.5, independently from other base nodes.

For a set S of base nodes, a subset A⊆S defines a partition of S to non-flipping classifiers in A and flipping classifiers in S\A. The probability, $P_\varepsilon(A)$, may be the probability that (A, S\A) is the partition of S to non-flipping, flipping classifiers. Thus, in the ensemble model with flipping base classifiers:

$$P_\varepsilon(A) = (1-\varepsilon)^{|A|} \cdot \varepsilon^{|S|-|A|} \qquad (20)$$

A variation of Equations (12)-(15) may be used for flipping base classifiers that similarly minimizes the expected exponential loss function E. In some embodiments, the flipping model may implement flipboosting.

In the flipboost technique, $w_i^{(t>1)}$ Equation (13) may be replaced by:

$$w_i^{(t>1)} \triangleq \prod_{j=1}^{t-1} [(1-\varepsilon)\exp\{-y_i\alpha_j h_j(x_i)\} + \varepsilon\exp\{y_i\alpha_j h_j(x_i)\}], \qquad (21)$$

and Equation (14) may be replaced by:

$$\alpha_t = \frac{1}{2}\ln\left(\frac{\sum_{i=1}^m w_i^{(t)}[(1-\varepsilon)I(h_t(x_i)=y_i) + \varepsilon I(h_t(x_i) \neq y_i)]}{\sum_{i=1}^m w_i^{(t)}[(1-\varepsilon)I(h_t(x_i)\neq y_i) + \varepsilon I(h_t(x_i) = y_i)]}\right). \qquad (22)$$

Classification by an aggregator (e.g., aggregation node 260 in FIG. 2), given the unknown to aggregator set A⊆[1, T] of non-flipped classifiers, may be given by:

$$\hat{y} = \text{sign}\left(\sum_{\substack{t=1 \\ t \in A}}^T \alpha_t h_t(x) - \sum_{\substack{t=1 \\ t \notin A}}^T \alpha_t h_t(x)\right). \qquad (23)$$

Equations (21)-(23) thus compute the training outputs $\{h_t\}_{t=1}^T$, $\{\alpha_t\}_{t=1}^T$ based on the flipping probability ε, and the result of Equation (23) follows from these training outputs and Equation (19).

Further, for flipping base nodes, at each iteration of training a base node, t, using Equations (21)-(23), the data weights $w_i^{(t)}$ and classifier weight $\alpha_t$ of $h_t$ minimize the expected exponential loss according to:

$$E \triangleq \sum_{A \subseteq [1,t]} P_\varepsilon(A) \sum_{i=1}^m \exp\left\{-y_i\left[\sum_{\substack{j=1 \\ j \in A}}^t \alpha_j h_j(x) - \sum_{\substack{j=1 \\ j \notin A}}^t \alpha_j h_j(x)\right]\right\},$$

given the classifiers $h_1, \ldots, h_{t-1}$ and their weights $\alpha_1, \ldots, \alpha_{t-1}$ found in previous iterations.

Similar to Equation (10), the expected loss with flipping base classifiers may be given by:

$$E = \sum_{i=1}^m \prod_{j=1}^t [(1-\varepsilon)\exp\{-y_i\alpha_j h_j(x_i)\} + \varepsilon\exp\{y_i\alpha_j h_j(x_i)\}]. \qquad (24)$$

For optimizing $h_t$, $\alpha_t$ the expected exponential loss may be decomposed as:

$$E = \sum_{i=1}^m \prod_{j=1}^{t-1} [(1-\varepsilon)\exp\{-y_i\alpha_j h_j(x_i)\} + \varepsilon\exp\{y_i\alpha_j h_j(x_i)\}] \cdot [ \qquad (25)$$

$$(1-\varepsilon)\exp\{-y_i\alpha_t h_t(x_i)\} + \varepsilon\exp\{y_i\alpha_t h_t(x_i)\}],$$

and for ε<0.5, the $h_t$ that minimizes the right-hand side of Equation (25) is the one trained with the weights $w_i^{(t)}$ in Equation (21). Taking the derivative of Equation (25) with respect to $\alpha_t$ and equating to zero, the minimizer in Equation (22) may be obtained. Unlike the straggling case, the optimal classifier weight $\alpha_t$ does depend on the flipping probability ε. If $\alpha_t$ is interpreted as the "confidence" of the combined classifier in $h_t$, then Equation (22) indicates that the expected/desired confidence is reduced as ε grows.

Figure 4:
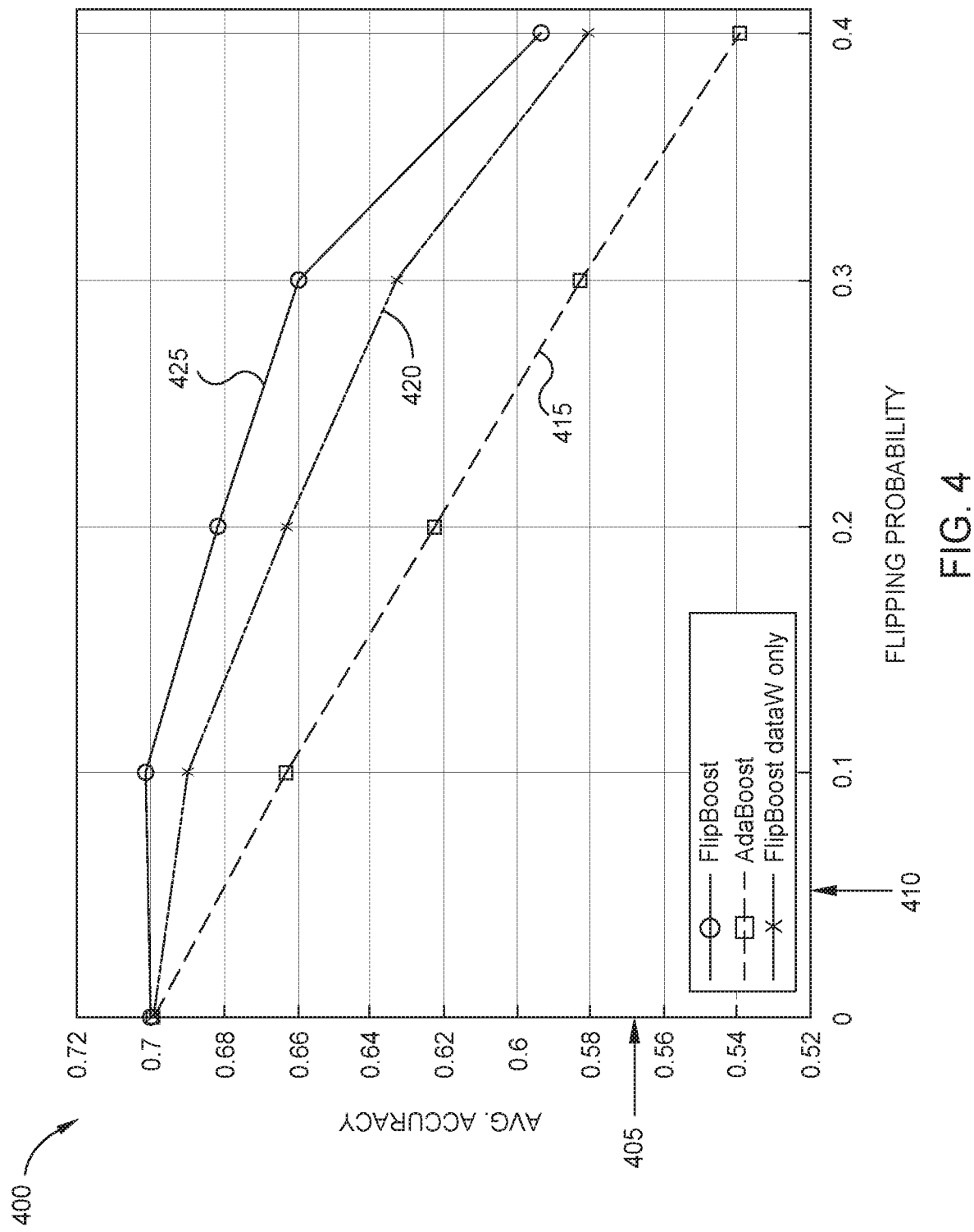
FIG. 4 depicts an example graph showing ensemble model performance improvements from enhanced adaptive boosting for flipping base classifiers (i.e., flipboosting), in accordance with some embodiments of the present disclosure.

Example Performance Improvements from Enhanced Adaptive Boosting for Flipping Base Classifiers FIG. 4 depicts an example graph 400 showing ensemble model performance improvements from enhanced adaptive boosting for flipping base classifiers (i.e., flipboosting).

In particular, graph 400 plots average accuracy results of obtained using an ensemble model on Y-axis 405 as a function of probability of flipping base classifiers (ε) on X-axis 410. To obtain the results of the graph 400, a test dataset was used to compare the results of conventional adaptive boosting (line 415) with flipboosting (line 425), and flipboosting with Equation (21) for the data weights, but with ε-independent Equation (14) being used for the classifier weights instead of Equation (22) (line 420).

The same test datasets as used to obtain the graph 400 are used to obtain the plots of the graph 400 and to train combined classifiers (with T=8 base classifiers) and evaluate their test-set average accuracy with flipping classifiers. Averaging is performed over 25,000 drawings of the set A⊆[1, T] partitioning [1, T] to non-flipping, flipping classifiers.

Graph 400 shows the results from the flipboosting (lines 420 and 425) provide consistently better accuracy for all plotted ε values compared to plot 415, which shows the results for conventional Adaboost.

Enhancing Ensemble Model Performance with Flip-Correcting Adaptive Boosting and Aggregator Decoding In addition to enhancing the training and weighting of the ensemble model classifiers for optimal expected loss given a flip parameter ε, an aggregator can be configured to detect flipped classifications in the outputs from base classifiers and correct (e.g., reverse-flip) these inputs before aggregating them, which may be referred to as aggregator decoding. A strength of this approach is that the aggregator's classification logic can implement a general function of the instantaneous base classification inputs, not necessarily a sum with fixed weights as in (23).

In order to describe flip-correcting adaptive boosting, first consider a dataset of m binary-labeled data points $(x_1, y_1), \ldots, (x_m, y_m)$, T classifiers $\{h_1, \ldots, h_T\}$, M-T redundant classifiers $\{f_1, \ldots, \eta_{M-T}\}$, and an aggregator decoding function D: $\{-1, 1\}^M \to \{-1, 1\}$ mapping the M potentially flipped classifier outputs $\{\tilde{h}_1(x), \ldots, \tilde{h}_T(x), \tilde{f}_1(x), \ldots, \tilde{f}_{M-T}(x)\}$ to an estimated $\hat{y}$ of the correct classification of x. The training objective is to maximize the probability that $\hat{y}$ equals the correct classification of x, where this probability is calculated from a test set of $\{(x_i, y_i)\}$ data points not in the training set. Conventional adaptive boosting (including the flipboosting enhancement described above) is a special case of the above where T=M, and the decoding function D is sign $(\Sigma_{t=1}^T \alpha_t \tilde{h}_t(x))$. This baseline may be improved by employing M-T>0 redundant classifiers trained specifically to combat flipping base classifiers.

One feature of flip-correcting adaptive boosting that contributes to its empirical superiority is high classifier diversity, attained due to the aggressive adaptation of the training set weighting between training iterations. Adding flip-correction capabilities requires adding inter-classifier dependence that allows a decoding function to detect and reverse the flips in its M inputs. Since classifier dependence reduces classifier diversity, flip-correcting adaptive boosting methods strike a healthy balance between the two. In particular, the flip-correcting adaptive boosting methods discussed herein maintain this balance by limiting the dependence to local sets of base classifiers, such as sets of three base classifiers (or "triples") in some embodiments. Other embodiments may have sets of more than three dependent base classifiers.

In the following discussion of an example flip-correcting adaptive boosting method, the base classifiers are considered as depth-1 decision trees, or "decision stumps". However, other embodiments may use other types of base classifiers. Certain example classifiers are discussed below with respect to FIGS. 9, 10A, 10B, and 11.

Given a data-point vector $x=[x_1, \ldots, x_d] \in \mathbb{R}^d$, a decision stump $g_{u,z}^k(\cdot)$, with $k \in \{1, \ldots, d\}$, $u \in \mathbb{R}$, $z \in \{-1, 1\}$, is the function defined as:

$$g_{u,z}^k(x) \triangleq \begin{cases} +1 & (x^k - u)z > 0 \\ -1 & (x^k - u)z \leq 0 \end{cases}, \quad (26)$$

where k is the coordinate chosen for the classification, u is the threshold, and z is the direction. Given a dataset $D=\{(x_i, y_i)\}_{i=1}^m$ and weights over the dataset: $W=(w_i)_{i=1}^m$: $\Sigma_{i=1}^m w_i=1$, a decision stump $g=g_{u,z}^k$ may be trained to minimize an average empirical risk $R_{D,W}(g)$, which for adaptive boosting is given by:

$$R_{D,W}(g) = \sum_{i=1}^m w_i I(g(x_i) \neq y_i) \quad (27)$$

The simplicity of the decision stump allows for efficiently finding the risk-minimizing classifier $g_{u^*,z^*}^{k^*}$ where $k^*$, $u^*$, $z^*=\mathrm{argmin}_{k,u,z} R_{D,W}(g_{u,z}^k)$.

In one embodiment, flip-correcting adaptive boosting may be performed with sets of three dependent base classifiers, or with "triple dependence".

For example, let M be the total number of base classifiers and assume M=3r for some integer r. Then let T=2M/3=2r and train T classifiers $h_1, \ldots, h_{2r}$ according to the conventional adaptive boosting sequence (e.g., Equations (2)-(5)). Then, the remaining M/3=r redundant classifiers may be trained as follows.

To train redundant classifier $f_j$, $j \in \{1, \ldots, r\}$, the two classifiers $h_{2j-1}$, $h_{2j}$ that were trained before may be used, in addition to the dataset $D=\{(x_i, y_i)\}_{i=1}^m$. These classifiers, $h_{2j-1}$, $h_{2j}$, $f_j$ may be referred to as a triple.

After an initial step of training T classifiers using an adaptive boosting method as described herein, the training may proceed training each set of dependent classifiers (e.g., each triple) independently.

Using a simplified notation: in a triple $h_{2j-1}$, $h_{2j}$, $f_j$, denote $g_1 \triangleq h_{2j-1}$, $g_2 \triangleq h_{2j}$, $f \triangleq f_j$. Then for a data point (x, y), two risk functions may be defined:

$$J^{(1)}(x, y; g_1, g_2, f) \triangleq \begin{cases} 1 & \begin{array}{l} f(x) \neq g_1(x) = y \\ \text{or} \\ f(x) \neq g_1(x) = g_2(x) \end{array} \\ 0 & \text{otherwise} \end{cases} \quad (28)$$

and $$J^{(2)}(x, y; g_1, g_2, f) \triangleq \begin{cases} 1 & \begin{array}{l} f(x) \neq g_2(x) = y \\ \text{or} \\ f(x) \neq g_2(x) = g_1(x) \end{array} \\ 0 & \text{otherwise} \end{cases}. \quad (29)$$

In each of Equations (28) and (29), the two conditions in the "or" statement are in general not mutually exclusive (specifically, both conditions are met in data points where $g_1(x)=g_2(x)=y$). Thus, the risk $J^{(1)}$ penalizes $f$ when its output differs from $g_1$, but only when $g_1$ agrees with either y or $g_2$ (or both). $J^{(2)}$ does the same symmetrically for $g_2$. Intuitively, each of the risk functions aims at two objectives simultaneously: (1) accuracy with respect to the correct classification (as usual in training), and (2) redundant computation of $g_1(x)$, $g_2(x)$ on data points where $g_1$ and $g_2$ agree. Succeeding in the second objective introduces correlation among the triple $g_1$, $g_2$, $f$ that can be exploited by the decoder to detect flips. The first objective makes $f$ a useful classifier regardless of flips.

For the point-wise risk functions $J^{(1)}$, $J^{(2)}$, corresponding average empirical risk functions (over the dataset) may be defined as follows:

$$R_{D,W}^{(1)}(f) = \sum_{i=1}^m v_i J^{(1)}(x_i, y_i; g_1, g_2, f), \quad (30)$$

and similarly $R_{D,W}^{(2)}(f)$ with $J^{(2)}$ replacing $J^{(1)}$ in the sum. Note that in the left-hand side of Equation (30), the dependence of $R^{(1)}$, $R^{(2)}$ on $g_1$, $g_2$, may be implicit, because the average risk functions are used to train $f$, while $g_1$, $g_2$ may be fixed from the first part of the training discussed above. The weights $v_i$ for the risk averaging may in one embodiment be given by:

$$v_i = \frac{1}{2}(w_i^{(1)} + w_i^{(2)}), \quad (31)$$

where $w_i^{(1)}$ and $w_i^{(2)}$ are the weights used to train $g_1$, $g_2 \triangleq h_{2j-1}$, $h_{2j}$, respectively in the adaptive boosting sequence above. The combined average empirical risk function may be defined by:

$$R_{D,W}(f) \triangleq [R_{D,W}^{(1)}(f)]^s + [R_{D,W}^{(2)}(f)]^s \qquad (32)$$

In the preceding equation, s is a hyper-parameter for the scheme that controls the tradeoff between minimizing the individual $R_{D,W}^{(1)}$ and $R_{D,W}^{(2)}$, and pushes the $f$ minimizing $R_{D,W}$ to be similar to both $g_1$ and $g_2$. A smaller s leads to $f$ that fits more data points overall (in the sense of having 0 outputs in Equations (28) and (29), with less care to balancing the fit to $g_1$ and $g_2$. Similarly, both $g_1$ and $g_2$ may be important in order to be able to detect flips in either of the two's outputs, but setting s too large may make $f$ a less useful classifier for triples with no flips. In practice, s may be set for a dataset to maximize classification performance.

Figure 5:
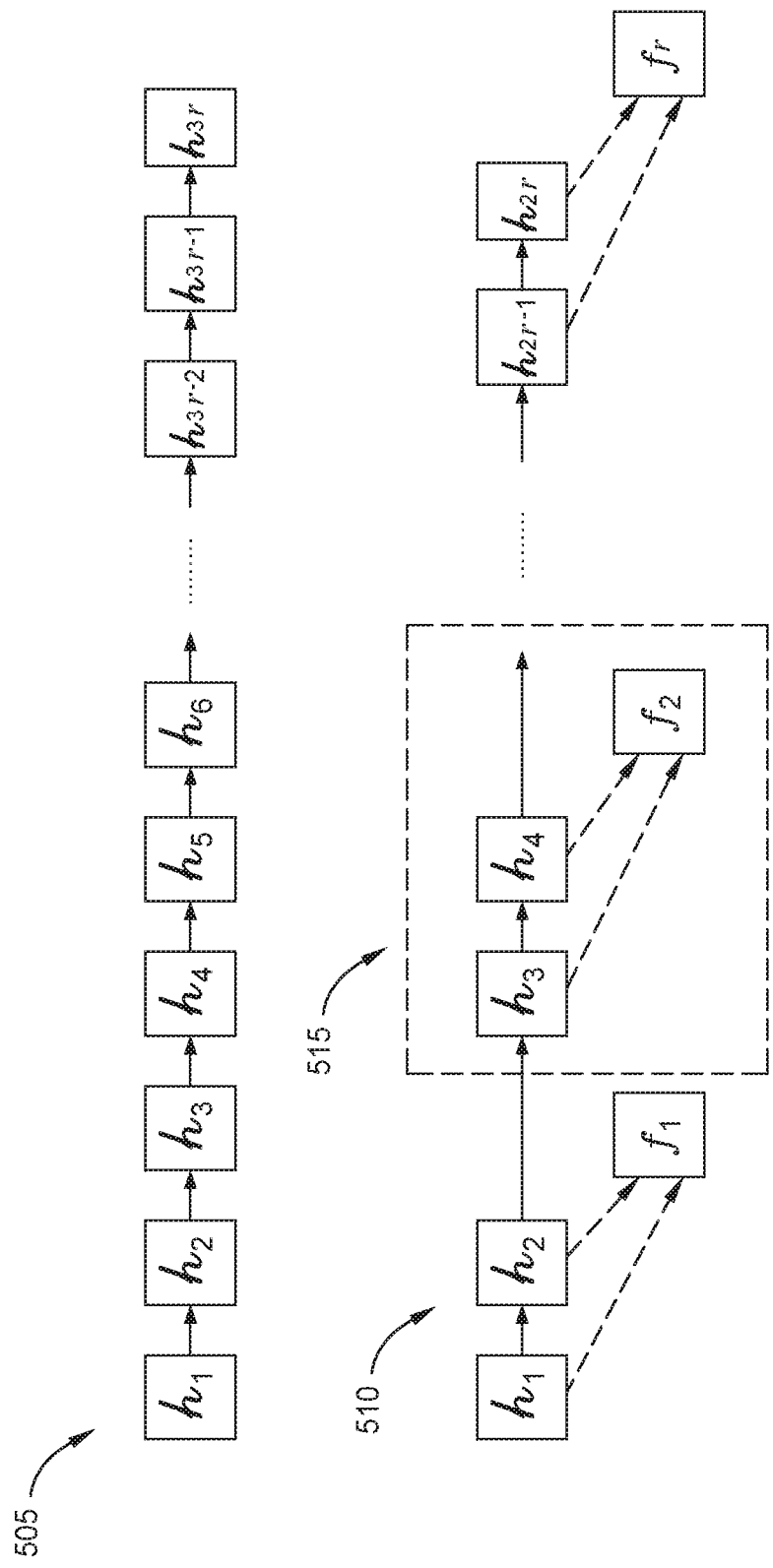
FIG. 5 compares an example training flow for conventional adaptive boosting with a training flow for flip-correcting adaptive boosting, in accordance with some embodiments of the present disclosure.

FIG. 5 compares an example training flow for conventional adaptive boosting 505 with a training flow for flip-correcting adaptive boosting 510. The training algorithm for flip-correcting adaptive boosting (discussed below) differs structurally from the description above in that the redundant base classifiers (f-classifiers) may be trained within the sequence of the original base classifiers (h-classifiers), and not after all the original base classifiers (h-classifiers) are trained. However, the two sequences are equivalent in terms of training outcome nonetheless because the trained h-classifiers do not depend on any of the f-classifiers (even if the f-classifier precedes the h-classifier in the sequence).

Once trained, a set of base classifiers, which in this example includes two base classifiers and one redundant base classifier (e.g. a "triple"), such as 515, may have outputs as in the following table:

TABLE 1

Example Outputs of Classifier "Triple"

| $h_t$ | $h_{t+1}$ | $f_{(t+1)/2}$ | Syndrome b E.g., Eq. (33) |
|---|---|---|---|
| + | + | + | 0 |
| + | − | + | 0 |
| − | + | + | 0 |
| − | − | + | −1 |
| + | + | − | +1 |
| + | − | − | 0 |
| − | + | − | 0 |
| − | − | − | 0 |

These sets of base classifiers outputs, which each include a redundant base classifier output, may then be decoded by a decoder (e.g., decoder 262 in FIG. 2) to correct flipped base classifiers outputs, as described in more detail below.

Flip-Correcting Adaptive Boosting Training Algorithm

The training algorithm for flip-correcting adaptive boosting may proceed as follows. Given an integer r and a dataset $D=\{(x_i, y_i)\}i=1^m$, for $t=1, 3, 5, \ldots, 2r-1$, then train $h_t(\bullet)$ to minimize $\rho_{i=1}^m w_i^{(t)} I(h_t(x_i) \neq y_i)$ with $w_i^{(t>1)} \triangleq \Pi_{j=1}^{t-1}[\exp\{y_i \alpha_j h_j(x_i)\}]$, $w_i^{(1)} \triangleq 1$ and set $$\alpha_t = \frac{1}{2} \ln\left( \frac{\sum_{i=1}^m w_i^{(t)} I(h_t(x_i) = y_i)}{\sum_{i=1}^m w_i^{(t)} I(h_t(x_i) \neq y_i)} \right).$$

Then, train $h_{t+1}(\bullet)$ to minimize $\Sigma_{i=1}^m w_i^{(t+1)} I(h_{t+1}(x_i) \neq y_i)$ with $w_i^{(t+1)} \triangleq \Pi_{j=1}^t [\exp\{-y_i \alpha_j h_j(x_i)\}]$.

Then, train $f_{(t+1)/2}(\bullet)$ to minimize:

$$R_{D,W}\left(f_{\frac{(t+1)}{2}}\right) = \left[\sum_{i=1}^m v_i^{\frac{t+1}{2}} J^{(1)}\left(x_i, y_i; h_t, h_{t+1}, f_{\frac{t+1}{2}}\right)\right]^s + \left[\sum_{i=1}^m v_i^{\frac{t+1}{2}} J^{(2)}\left(x_i, y_i; h_t, h_{t+1}, f_{\frac{t+1}{2}}\right)\right]^s,$$

with $$v_i^{(t+1)/2} \triangleq \frac{1}{2}\left(w_i^{(t)} + w_i^{(t+1)}\right).$$

Then, set:

$$\alpha_{t+1} = \frac{1}{2}\ln\left(\frac{\sum_{i=1}^m w_i^{(t+1)} I(h_{t+1}(x_i) = y_i)}{\sum_{i=1}^m w_i^{(t+1)} I(h_{t+1}(x_i) \neq y_i)}\right),$$

$$\beta_{\frac{t+1}{2}} = \frac{1}{2}\ln\left(\frac{\sum_{i=1}^m v_i^{\frac{t+1}{2}} I(f_{(t+1)/2}(x_i) = y_i)}{\sum_{i=1}^m v_i^{\frac{t+1}{2}} I(f_{(t+1)/2}(x_i) \neq y_i)}\right)$$

The preceding training algorithm outputs functions: $h_1$, $h_2, \ldots, h_{2r}$, $f_1, f_2, \ldots, f_r$ and scalars $\alpha_1, \alpha_2, \ldots, \alpha_{2r}$ and $\beta_1, \beta_2, \ldots, \beta_r$.

The training sequence discussed above builds into $$f_{\frac{t+1}{2}}$$

dependence on its co-members in the triple $h_t$, $h_{t+1}$. Intuitively, this property allows $$f_{\frac{t+1}{2}}$$

to "check" the possibly flipped outputs of $h_t$, $h_{t+1}$, and detect errors in some cases. This intuition is made more concrete by using a decoder in an aggregator (e.g., decoder 262 of FIG. 2) for classification.

Aggregator Decoder for a Model Trained Using Flip Correcting Adaptive Boosting

A decoder for a model trained using flip correcting adaptive boosting may be formulated as follows.

Given a length-3r vector:

$$u \triangleq [\tilde{h}_1(x), \tilde{h}_2(x), \tilde{f}_1(x), \tilde{h}_3(x), \tilde{h}_4(x), \tilde{f}_2(x) \ldots \tilde{h}_{2r-1}(x), \tilde{h}_{2r}(x), \tilde{f}_r(x)]$$

Compute a length-r syndrome vector b, where:

$$b_j = \begin{cases} 1 & u_{3j-2} = u_{3j-1} = 1, u_{3j} = -1 \\ -1 & u_{3j-2} = u_{3j-1} = -1, u_{3j} = 1 \\ 0 & \text{otherwise} \end{cases} \quad (33)$$

Then, define sets $B_+=\{j: b_j=1\}$, $B_-=\{j: b_j=-1\}$.
Then initialize u':=u.
Then, if $|B_+|>|B_-|$, then update $u'_{3j-2}:=0$, $u'_{3j-1}:=0$ for each $j \in B_+$ and if $|B_-|>|B_+|$, then update $u'_{3j-2}:=0$, $u'_{3j-1}:=0$ for each $j \in B_-$.
Then the classification output can be determined according to:

$$\hat{y} = \text{sign}\left(\sum_{j=1}^{r} \alpha_{2j-1} u'_{3j-2} + \alpha_{2j} u'_{3j-1} + \beta_j u'_{3j}\right), \quad (34)$$

where $\alpha_1, \alpha_2, \ldots, \alpha_{2r}$ and $\beta_1, \beta_2, \ldots, \beta_r$ are the scalar outputs from above.

The decoder, similar to a conventional Adaboost classifier, takes as inputs the (potentially flipped) base classifier outputs, and delivers a classification output based on a weighted sum of these inputs. But unlike conventional Adaboost, the weighted sum as discussed above is calculated on a corrected vector of classification inputs, based on an estimate the decoder acquires on the flips in u. This estimate is based on observing triples where the two h-inputs agree with each other, but disagree with the f-input. Each such triple is marked as a non-zero in the syndrome vector b with a sign set to the sign of the h-inputs. The intuition behind marking those triples is that $f_i$ was trained to match $h_{2j-1}$, $h_{2j}$ when they agree (as in equations (28) and (29), above), so a mismatch is an indication of a possible flip.

From the syndrome vector b, the decoder calculates a global direction for correction: downward if the majority is +1, and upward if the majority is −1. The justification for this is that the most probable flip in a triple with +1 syndrome is that one of the h-inputs was flipped from −1 to +1, so a majority of +1 syndromes suggests correction of the suspected h-inputs from +1 to 0. This is symmetrically true in reverse for a majority of −1 syndromes. In some cases, a global correction direction may be chosen because the syndrome majority is more robust than individual syndromes in detecting the combined effect of the flips in u on the final classification output $\hat{y}$.

Figure 6:
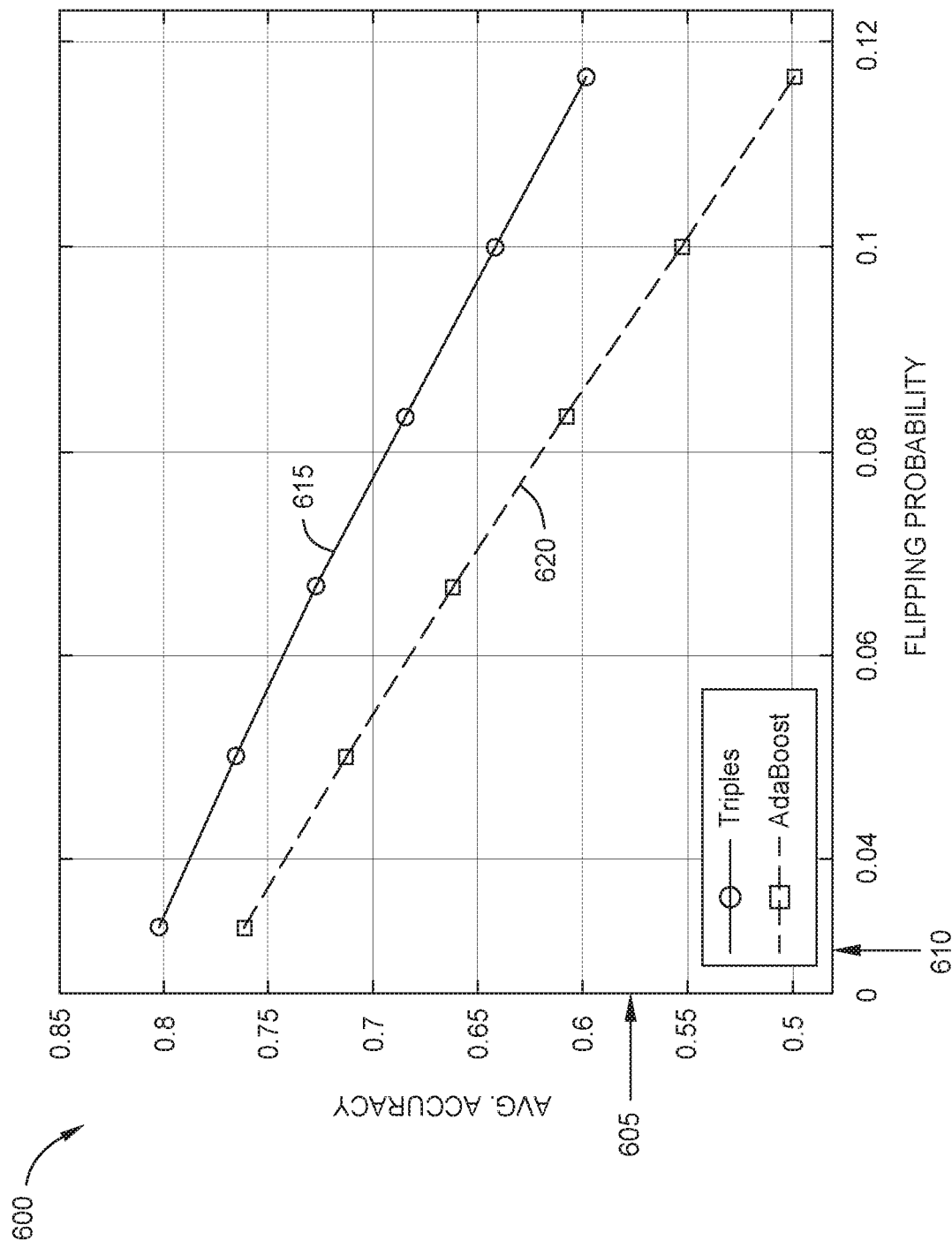
FIG. 6 depicts an example graph showing performance improvements from flip-correcting adaptive boosting and aggregator decoding, in accordance with some embodiments of the present disclosure.

Example Performance Improvements from Flip Correcting Adaptive Boosting and Aggregator Decoding FIG. 6 depicts an example graph 600 showing performance improvements from flip correcting adaptive boosting and aggregator decoding, in accordance with some embodiments of the present disclosure.

In particular, in this example, an ensemble model enhanced with from flip correcting adaptive boosting and aggregator decoding was tested on a face-detection problem using a publically accessible database containing 2901 face images and 28121 non-face images, each given as 19×19 8-bit grayscale values. From the database, two sets of 1000 face images and 1000 non-face images are taken. Each image from one set is taken to be the training dataset and the images from the other set are taken to be the test dataset. The training dataset is used to train two ensemble models: one with adaptive boosted classifiers using conventional Adaboost, and another one using flip correcting adaptive boosting and aggregator decoding classifiers. Each model is trained to classify between faces (label +1) and non-faces (label −1).

For both ensemble models, M=30 base nodes, which corresponds to T=20 h-classifiers and M−T=10 f-classifiers for flip correcting adaptive boosting and T=30 h-classifiers for conventional Adaboost. For flip correcting adaptive boosting the training was run once for the dataset, and the same base classifiers and weights were used for all flipping probabilities. The training hyper-parameter s was set to 3 for the dataset.

Graph 600 plots accuracy averaged across 10,000 instances on Y-axis 605 against a flipping probability (ε) on X-axis 610. The graph 600 shows significant advantage of flip-correcting adaptive boosting (shown by plot 615) over conventional adaptive boosting (shown by plot 620), which grows more significant as ε increases.

Example Process for Performing Enhanced Adaptive Boosting on Ensemble Models

Figure 7:
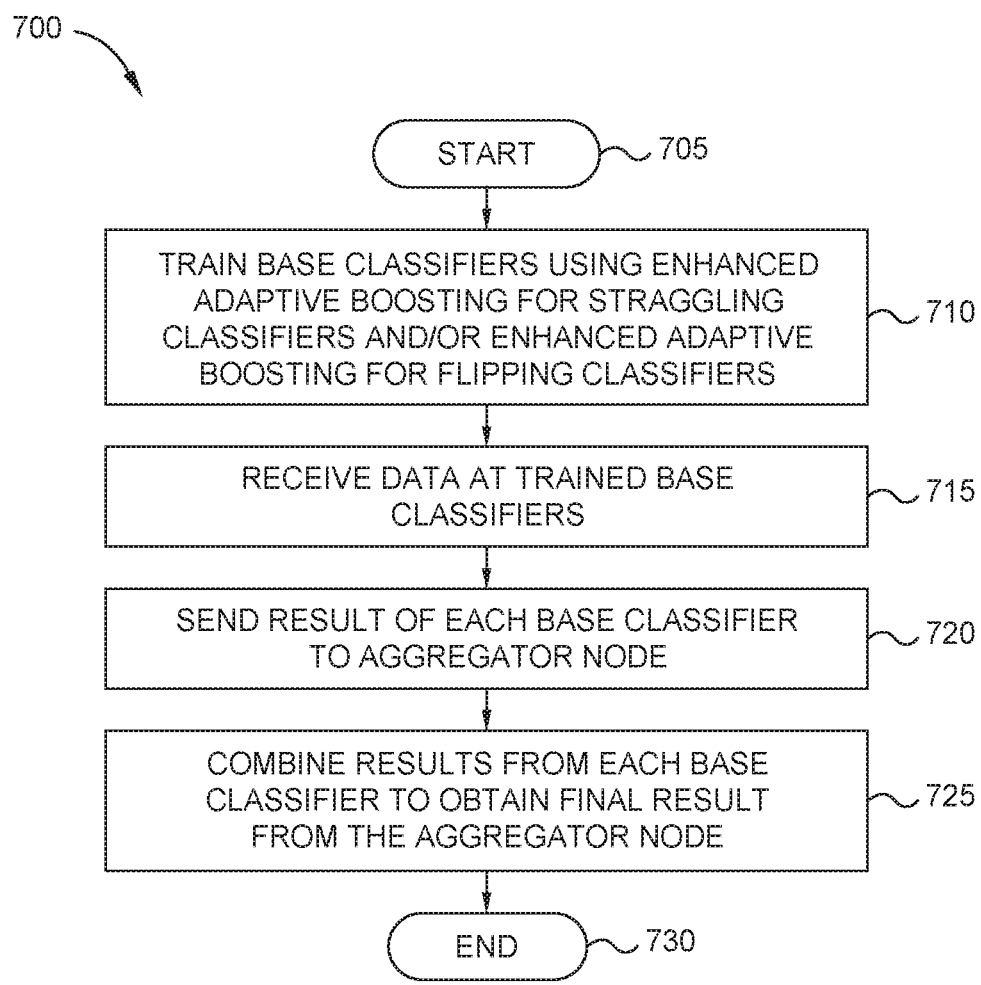
FIG. 7 depicts an example process of training and inferencing with an ensemble model trained using one or more enhanced boosting methods, in accordance with some embodiments of the present disclosure.

FIG. 7 depicts an example process 700 for training and inferencing with an ensemble model trained using one or more enhanced boosting methods, in accordance with some embodiments of the present disclosure. In some embodiments, process 700 may be implemented by a model optimization component, such as by optimization component 285 of FIG. 2, in order to improve the performance of an ensemble model.

After starting at operation 705, process 700 trains one or more base classifiers, such as base classifiers 240A-240T in FIG. 2, at operation 710 using one or both of enhanced adaptive boosting for straggling base classifiers (stragboosting) and enhanced adaptive boosting for flipping base classifiers (flipboosting).

After training the base classifiers at operation 710, the trained base classifiers receive new data to be processed at operation 715. The outputs (e.g., the intermediate outputs 255A-255T in FIG. 2) generated by the base classifiers may then be sent to an aggregator (e.g., aggregator node 260 in FIG. 2) at operation 720. The aggregator may combine the intermediate results, at operation 725, as discussed above, to obtain a final result. The process 700 ends at operation 730.

Other embodiments of process 700 may include additional or other operations depending upon the particular embodiment.

Figure 8:
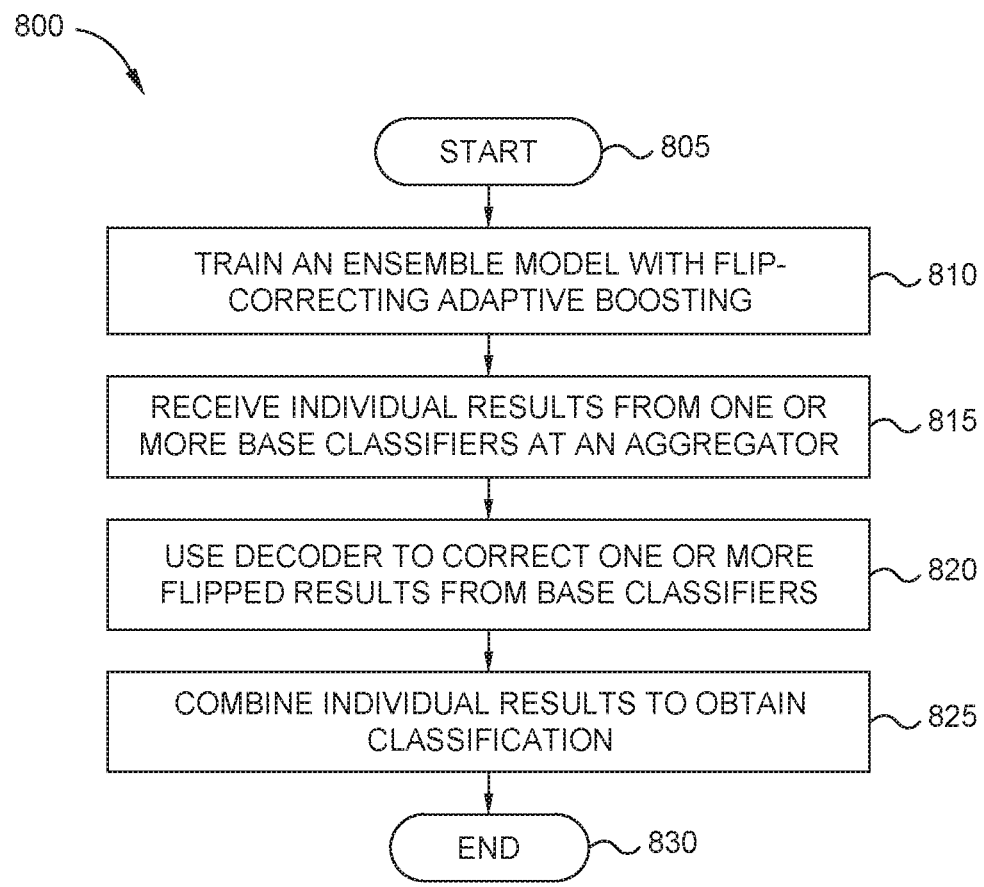
FIG. 8 depicts an example process for performing aggregator decoding in an ensemble model, in accordance with some embodiments of the present disclosure.

Example Process for Performing Flip-Correcting Adaptive Boosting on Ensemble Models FIG. 8 depicts an example process 800 for performing flip-correcting adaptive boosting on an ensemble model, in accordance with some embodiments of the present disclosure. In some embodiments, process 800 may be implemented by model optimization component, such as by optimization component 285 of FIG. 2, in order to improve the performance of an ensemble model.

Upon starting at operation 805, process 800 trains one or more base classifiers, such as base classifiers 240A-240T in FIG. 2, at operation 810 using flip-correcting adaptive boosting.

Then at operation 815, an aggregator (e.g., aggregator node 260 in FIG. 2) receives output (e.g., intermediate results 255A-255T in FIG. 2) from one or more base classifiers (e.g., one or more of base classifiers 240A-240T in FIG. 2). The base classifiers may or may not have been trained using one or both of the enhanced adaptive boosting methods discussed above (stragboosting and flipboosting).

Then, at operation 820, a decoder (e.g., decoder 262 in FIG. 2) determines which outputs from the one or more base classifiers need to be corrected, such as by the decoding method described above. In some embodiments, the decoder is part of an aggregator (e.g., aggregator 260 in FIG. 2).

Then, at operation 825, the aggregator combines the outputs from the one or more base classifiers, including any flip-corrected outputs, and generates a classification. In some embodiments, the output of the aggregator may further be modified by a function, such as the sign function 270 in FIG. 2, or another function.

The process 800 ends at operation 830.

Other embodiments of process 800 may include additional or other operations depending upon the particular embodiment.

Example Base Classifiers

Figure 9:
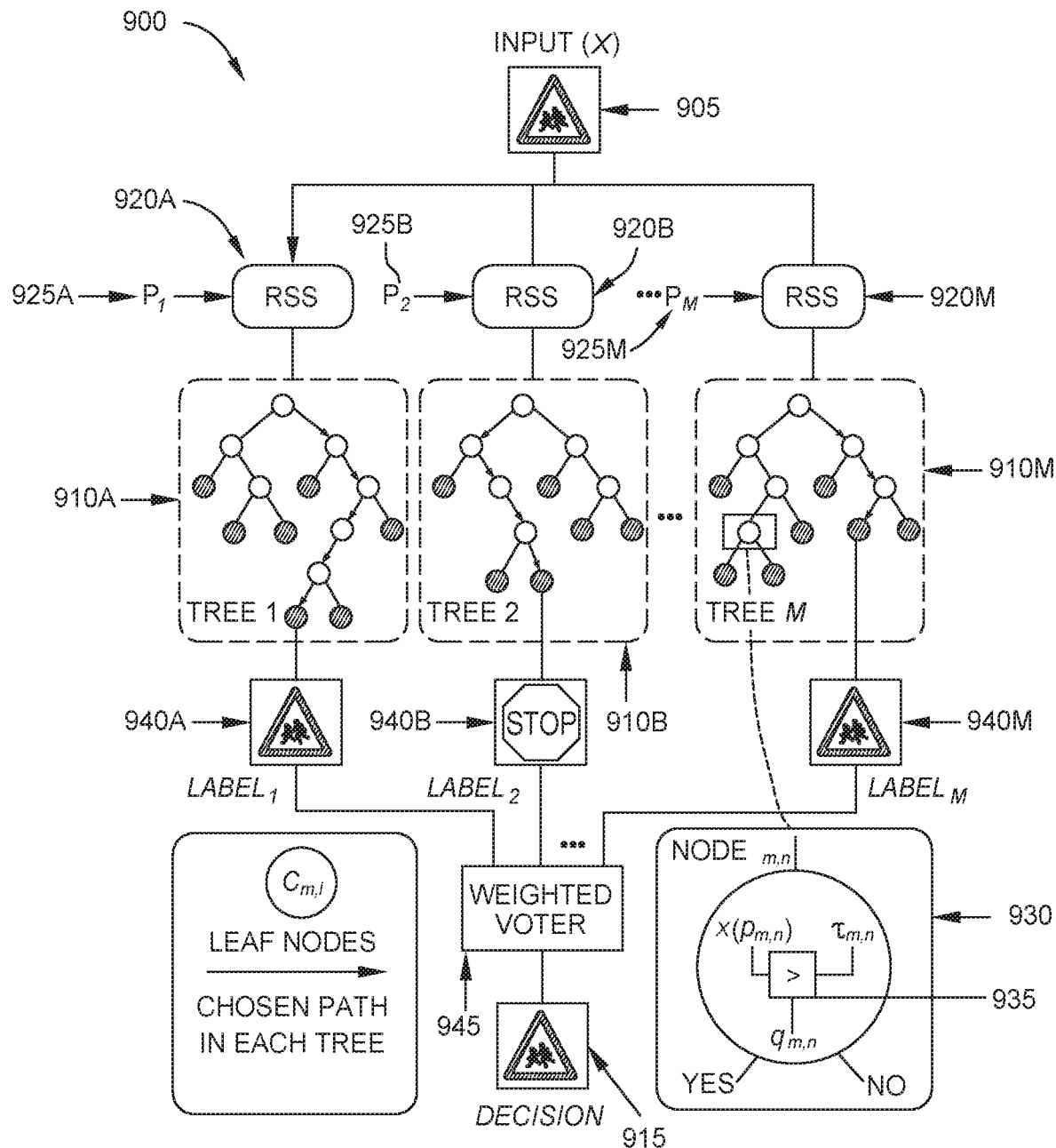
FIG. 9 is an example block diagram of a decision tree classifier, in accordance with some embodiments of the present disclosure.

FIG. 9 depicts an example decision tree classifier 900, in accordance with some embodiments of the present disclosure. The decision tree classifier 900 may be used as one or more of the base classifiers 240A-240T in the ensemble model 235 of FIG. 2. It is to be understood that the decision tree classifier 900 is only an example and the configuration of the decision tree may vary in other embodiments. Generally speaking, any type of decision tree that is considered suitable for the ensemble model 235 may be used.

In this embodiment, decision tree classifier 900 includes input data 905 that is input into a plurality of decision trees 910A-910M to obtain an output 915. In some embodiments, the input data 905 may be pre-processed by performing Random Sub-Sampling ("RSS") operation 920A-920M using a pseudorandom pattern vector, P, 925A-925M. The result of each of RSS operations 920A-920M may be input into a corresponding one of the decision trees 910A-910M. Each of the decision trees 910A-910M may include a plurality of nodes, only one which is marked by reference numeral 930 and shown in greater detail in FIG. 9.

Each of the decision trees 910A-910M may include a maximum of N nodes. Each of the nodes 930 receives one input and generates two branches (left branch and right branch) as output. The branch that is pursued is based upon the result of the node 930. Specifically, each of the node 930 includes a comparator 935 that compares data, $X(P_{m,n})$, with a threshold, $T_{m,n}$, to obtain a node result $Q_{m,n}$. Based upon the value of $Q_{m,n}$, either the left branch or the right branch of the node is pursued to the next node. Thus, $Q_{m,n}$ is input as $X(P_{m,n})$ to the next node that is selected. $P_{m,n}$ is an index that identifies an $n^{th}$ node in an $m^{th}$ decision tree of the decision trees 910A-910M. The above process of comparing using the comparator 935 in each of the decision trees 910A-910M is repeated until a leaf node is reached in each decision tree. The result of the leaf node of each of the decision trees 910A-910M forms the overall result of that decision tree and is represented by a label 940A-940M.

Each of the labels 940A-940M may be input into an aggregator node, such as weighted voter 945, which combines the labels using a weighted computation to obtain the output 915. Specifically, each of the decision trees 910A-910M may have a weight associated therewith. Generally, the higher the weight, greater is the impact of that decision tree on the output 915. Each of the decision trees 910A-910M may be trained using the straggling model or the flipping model discussed above to improve the accuracy of the output 915. In some embodiments, the weighted voter 945 may also implement the flip correcting adaptive boosting technique discussed above to further improve the accuracy of the output 915.

Figure 10A:
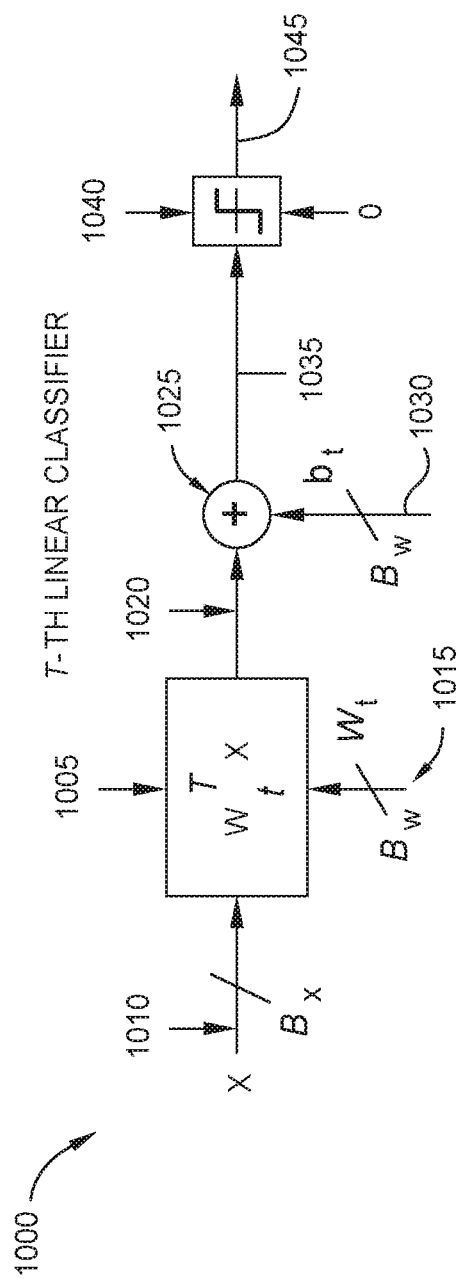
FIGS. 10A and 10B are example block diagrams showing implementations of linear classifiers, in accordance with some embodiments of the present disclosure.
Figure 10B:
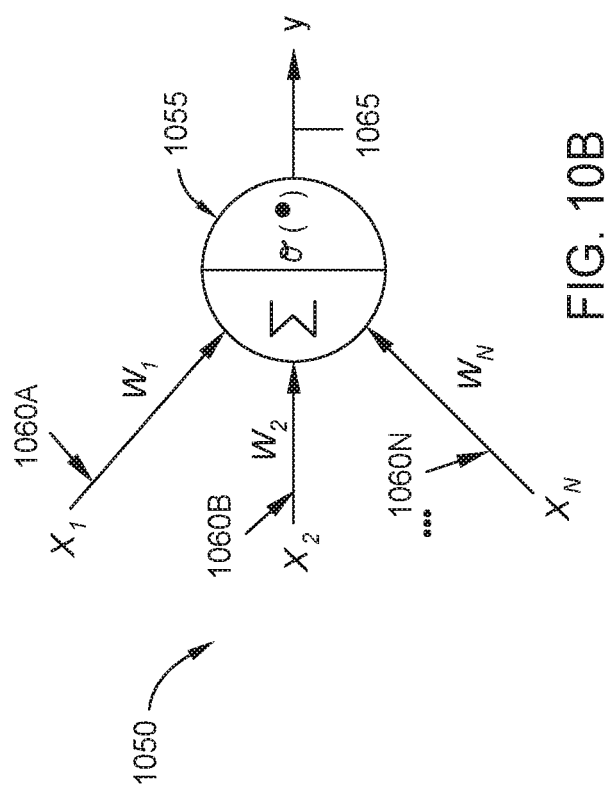

FIGS. 10A and 10B depict example single layer classifiers, in accordance with some embodiments of the present disclosure. The single level classifiers of FIGS. 10A and 10B may be used in one or more of the base classifiers 240A-240T of FIG. 2.

The single level classifier of FIG. 10A is a support vector machine and the single level classifier of FIG. 10B is a single level neural network. Referring specifically to FIG. 10A, a support vector machine 1000 includes a function 1005 that computes $w_t^T x$, where x is a $B_x$-bit input data 1010 and $w_t$ is a $B_w$-bit weight 1015. T denotes a transpose of $w_t^T x$ such that $w_t^T x = \Sigma_{d=1}^{D} w_{t,d} x_d$. $B_x$ and $B_w$ represent the bit precision values of the input data 1010 and the weight 1015, respectively. Result 1020 of the function 1005 is input into a summation block 1025 that performs the following operation: $w_t^T x + b$, where b is the bias value 430.

Result 1035 of the summation block 1025 is input into a sign function 1040 to generate a final output 1045. The support vector machine 1000 may be trained using the enhanced adaptive boosting methods discussed above (e.g., stragboost and flipboost) to improve the accuracy of the output 1035. In some embodiments, the support vector machine 1000 may also implement the flip correcting adaptive boosting method discussed above to further improve the accuracy of the output 1035.

FIG. 10B shows an example of a single layer neural network 1050. In the single layer neural network 1050, a summation function 1055 is applied to a plurality of data values and associated weight values 1060A-1060N. The summation function 1055 may implement the following mathematical function to obtain output 1065 according to $y_t = \rho(w_t^T x + b)$, where b is the bias value; x is the data value; $w_t$ is the weight value, and $w_t^T x = \Sigma_{d=1}^{D} w_{t,d} x_d$.

The single layer neural network 1050 may be trained using the enhanced adaptive boosting methods discussed above (e.g., stragboost and flipboost) discussed above to improve the accuracy of the output 1065. In some embodiments, the single layer neural network 1050 may also implement the flip correcting adaptive boosting method discussed above to further improve the accuracy of the output 1065.

Figure 11:
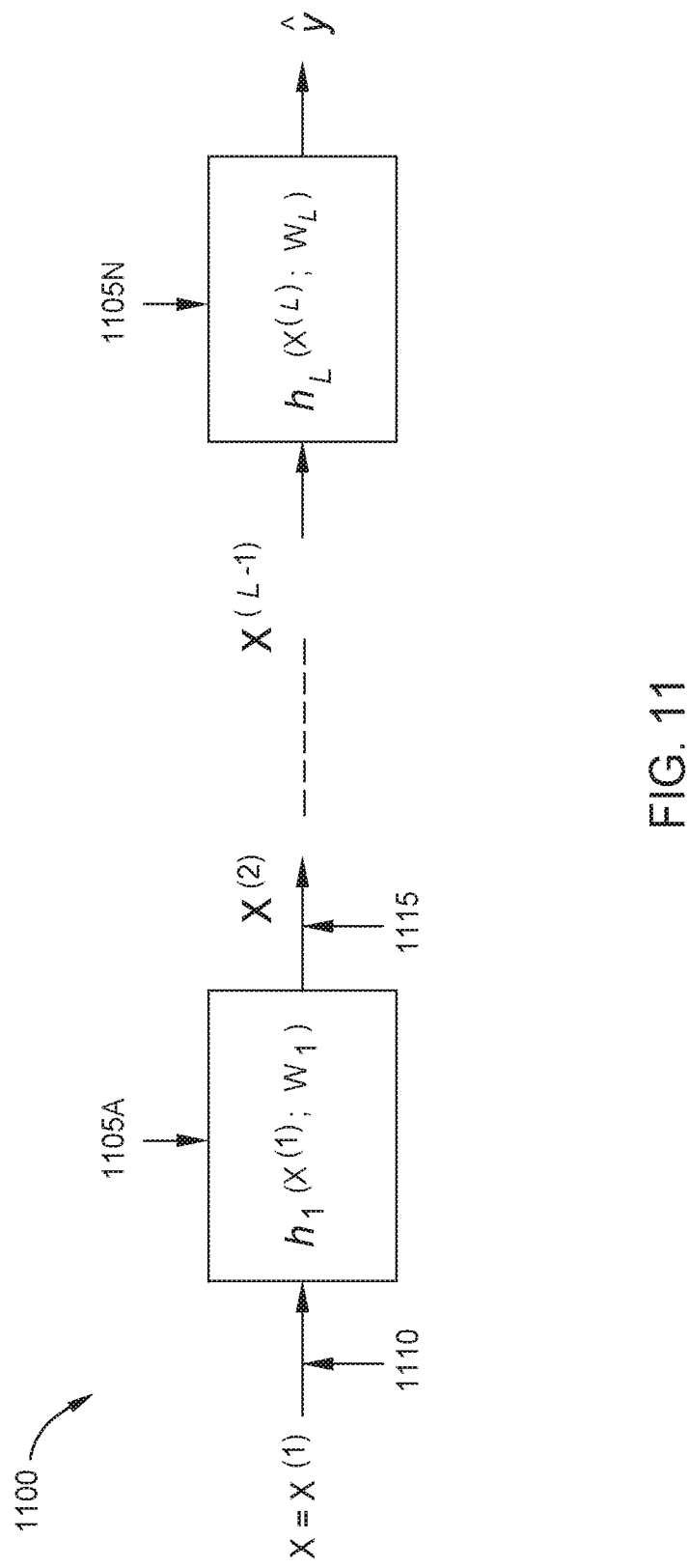
FIG. 11 is an example block diagram showing an implementation of a deep neural network, in accordance with some embodiments of the present disclosure.

FIG. 11 depicts an example multi-layer neural network or deep neural network 1100, in accordance with some embodiments of the present disclosure. The deep neural network 1100 includes multiple layers 1105A-1105N. Each of the layers 1105A-1105N receives an output from a previous layer as input or the input data as input. For example, the layer 1105A receives input data 1110 as input, the layer 1105B receives output 1115 of the layer 1105A as input, and so on. Each of the layers 1105A-1105N is also associated with a weight value, w. For example, the layer 1105A is associated with a weight value, $w_1$, the layer 1105B is associated with a weight value, $w_2$, and so on. Each of the layers 1105A-105N implements the following mathematical function: $\Sigma_{d=1}^{D} w_{t,d}^{(l)} x_d + b_t^{(l)}$ where: $w_t^{(l)} = (w_{t,1}^{(l)}, \ldots, w_{t,D}^{(l)})$ and $x = (x_1, \ldots, x_D)$. In this example, the superscript (l) denotes the layer index, $b_t^{(l)}$ the bias and $w_t^{(l)}$ is the weight value.

The deep neural network 1100 may be trained using the enhanced adaptive boosting methods discussed above (e.g., stragboost and flipboost) to improve the accuracy of the output from the deep neural network. In some embodiments, the deep neural network 1100 may also implement the flip correcting adaptive boosting method discussed above to further improve the accuracy of the output from the deep neural network.

Figure 12:
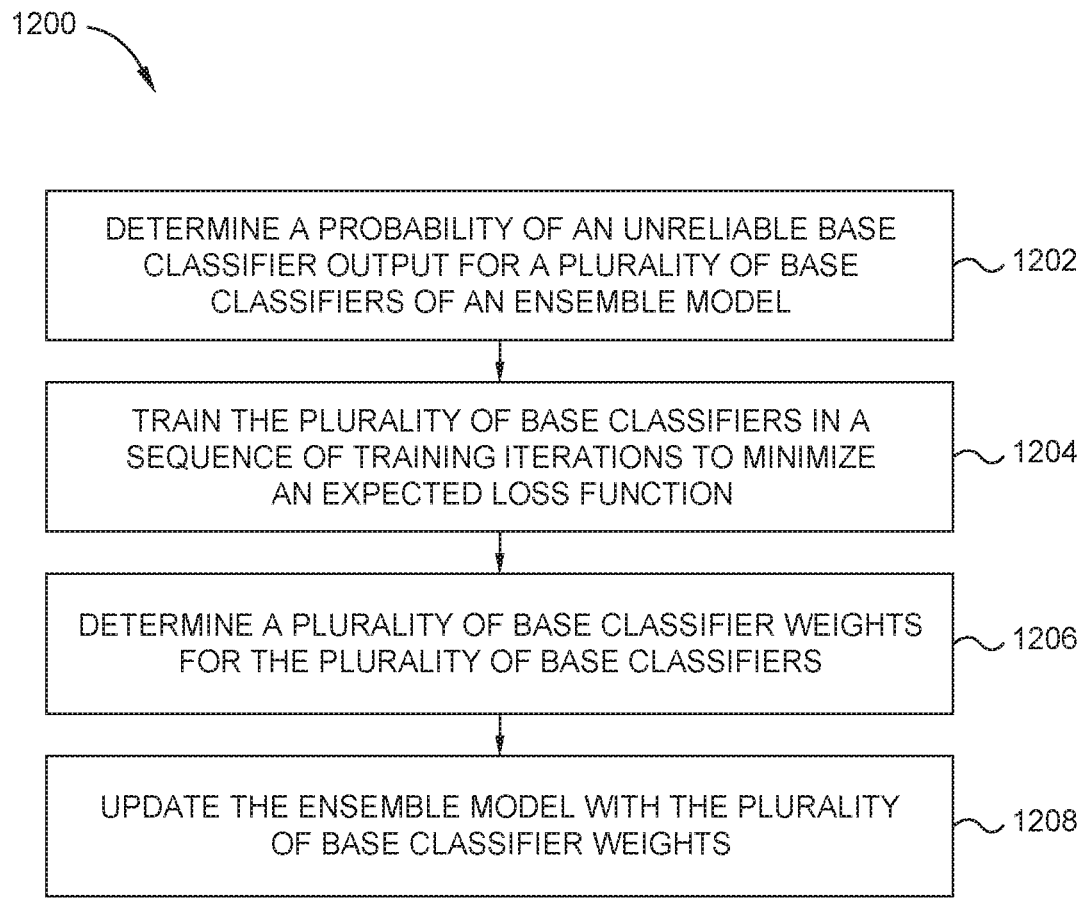
FIG. 12 depicts an example method for training a machine learning model, in accordance with some embodiments of the present disclosure.

Example Method for Training an Ensemble Model Using Enhanced Adaptive Boosting FIG. 12 depicts an example method 1200 for training a machine learning model.

Method 1200 begins at step 1202 with determining a probability of an unreliable base classifier output for a plurality of base classifiers of an ensemble model. In some embodiments, the probability of an unreliable base classifier output is greater than a threshold value, such as 0.

Method 1200 then proceeds to step 1204 with training the plurality of base classifiers in a sequence of training iterations to minimize an expected loss function. In some embodiments, each training iteration of the sequence of training iterations is associated with one base classifier of the plurality of base classifiers. Further, in some embodiments, the expected loss function accounts for the probability of an unreliable base classifier output.

Method 1200 then proceeds to step 1206 with determining a plurality of base classifier weights for the plurality of base classifiers, wherein each base classifier weight of the plurality of base classifier weights is associated with one base classifier of the plurality of base classifiers.

Method 1200 then proceeds to step 1208 with updating the ensemble model with the plurality of base classifier weights.

In some embodiments of method 1200, the expected loss function comprises an expected exponential loss function.

In some embodiments of method 1200, the probability of an unreliable base classifier output η comprises the probability of a straggling base classifier, the expected exponential loss function for each training iteration t is $\overline{E}=\Sigma_{i=1}^{m} w_i^{(t)} \cdot [(1-\eta)\exp\{-y_i \alpha_t h_t(x_i)\}+\eta]$, $w_i^{(t)}$ is a data point weight for data point $\{x_i, y_i\}$, and $\alpha_t$ is a base classifier weight of the plurality of base classifier weights associated with a base classifier $h_t$ of the plurality of base classifiers.

In some embodiments of method 1200, determining the plurality of base classifier weights for the plurality of base classifiers, comprises: for each training iteration t, setting a base classifier weight $\alpha_t$ for a base classifier $h_t$ of the plurality of base classifiers according to:

$$\alpha_t = \frac{1}{2}\ln\left(\frac{\sum_{i=1}^{m} w_i^{(t)} I(h_t(x_i) = y_i)}{\sum_{i=1}^{m} w_i^{(t)} I(h_t(x_i) \neq y_i)}\right).$$

In some embodiments, method 1200 further includes determining an updated base classifier weight for a subset of base classifiers of the plurality of base classifiers, wherein each base classifier of the subset of base classifiers comprises a non-straggling base classifier.

In some embodiments, method 1200 further includes performing a classification with an aggregator of the ensemble model based on a non-straggling subset of base classifiers of the plurality of base classifiers. In some embodiments of method 1200, the classification is performed according to:

and A is the non-straggling subset of base classifiers in the plurality of base classifiers T.

In some embodiments of method 1200, the probability of an unreliable base classifier output ε comprises the probability of a flipping base classifier, the expected exponential loss function for each training iteration t is $\overline{E}=\Sigma_{i=1}^{m}\Pi_{j=1}^{t'}[(1-\varepsilon)\exp\{-y_i \alpha_j h_j(x_i)\}+\varepsilon \exp\{y_i \alpha_j h_j(x_i)\}]$, $w_i^{(t)}$ is a data point weight for data point $x_i$, and $\alpha_t$ is a base classifier weight of the plurality of base classifier weights associated with a base classifier $h_t$ of the plurality of base classifiers.

In some embodiments of method 1200, determining the plurality of base classifier weights for the plurality of base classifiers, comprises: for each training iteration t, setting a base classifier weight $\alpha_t$ for a base classifier $h_t$ of the plurality of base classifiers according to:

$$\alpha_t = \frac{1}{2}\ln\left(\frac{\sum_{i=1}^{m} w_i^{(t)}[(1-\varepsilon)I(h_t(x_i)=y_i) + \varepsilon\, I(h_t(x_i)\neq y_i)]}{\sum_{i=1}^{m} w_i^{(t)}[(1-\varepsilon)I(h_t(x_i)\neq y_i) + \varepsilon\, I(h_t(x_i)=y_i)]}\right).$$

In some embodiments, method 1200 further includes performing a classification with an aggregator of the ensemble model according to:

$$\hat{y} = \text{sign}\left(\sum_{\substack{t=1 \\ t\in A}}^{T} \alpha_t h_t(x) - \sum_{\substack{t=1 \\ t\notin A}}^{T} \alpha_t h_t(x)\right),$$

wherein A is a subset of non-flipping base classifiers in the plurality of base classifiers T.

Notably, method 1200 is just one example, and others are possible, which may include more, fewer, or different steps as compared to the example described herein.

Figure 13:
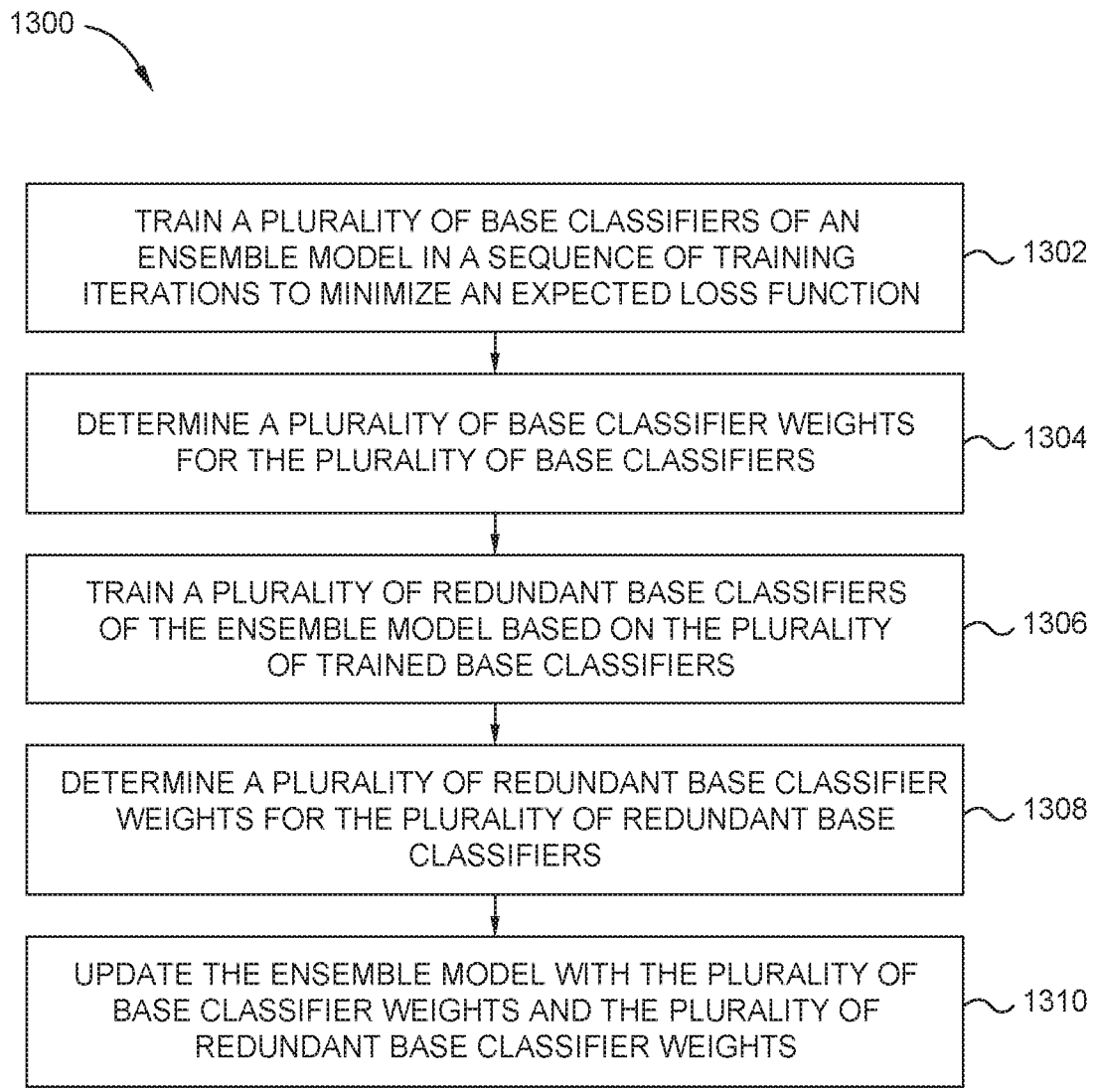
FIG. 13 depicts another example method of training a machine learning model, in accordance with some embodiments of the present disclosure.

Example Method for Training an Ensemble Model with Redundant Base Classifiers FIG. 13 depicts another example method 1300 of training a machine learning model.

Method 1300 beings at step 1302 with training a plurality of base classifiers of an ensemble model in a sequence of training iterations to minimize an expected loss function, wherein each training iteration of the sequence of training iterations is associated with one base classifier of the plurality of base classifiers.

Method 1300 then proceeds to step 1304 with determining a plurality of base classifier weights for the plurality of base classifiers. In some embodiments of method 1300, each base classifier weight of the plurality of base classifier weights is associated with one base classifier of the plurality of base classifiers.

Method 1300 then proceeds to step 1306 with training a plurality of redundant base classifiers of the ensemble model based on the plurality of trained base classifiers.

Method 1300 then proceeds to step 1308 with determining a plurality of redundant base classifier weights for the plurality of redundant base classifiers, wherein each redundant base classifier weight of the plurality of redundant base classifier weights is associated with one redundant base classifier of the plurality of redundant base classifiers.

Method 1300 then proceeds to step 1310 with updating the ensemble model with the plurality of base classifier weights and the plurality of redundant base classifier weights.

In some embodiments of method 1300, each redundant base classifier of the plurality of redundant base classifiers is trained based on a unique set of two base classifiers of the plurality of base classifiers to form a triple of classifiers.

In some embodiments of method 1300, training each respective redundant base classifier of the plurality of redundant base classifiers comprises minimizing $$\left[\sum\nolimits_{i=1}^{m} v_i^{\frac{t+1}{2}} J^{(1)}\left(x_i, y_i; h_t, h_{t+1}, f_{\frac{t+1}{2}}\right)\right]^s +$$

$$\left[\sum\nolimits_{i=1}^{m} v_i^{\frac{t+1}{2}} J^{(2)}\left(x_i, y_i; h_t, h_{t+1}, f_{\frac{t+1}{2}}\right)\right]^s$$

for the respective redundant base classifier, wherein:

$$v_i^{\frac{t+1}{2}}$$

comprises a risk averaging weight, $J^{(1)}$ comprises a second risk function, $J^{(2)}$ comprises a second risk function, $h_t$ is a first base classifier, $h_{t+1}$ is a second base classifier, $$f_{\frac{t+1}{2}}$$

is a redundant base classifier trained based on $h_t$ and $h_{t+1}$, s is hyperparameter, and $\{x_i, y_i\}$ is a data point.

In some embodiments, method 1300 further includes performing a classification with an aggregator of the ensemble model, wherein the aggregator is configured to decode input data based on the plurality of redundant base classifiers.

Figure 14:
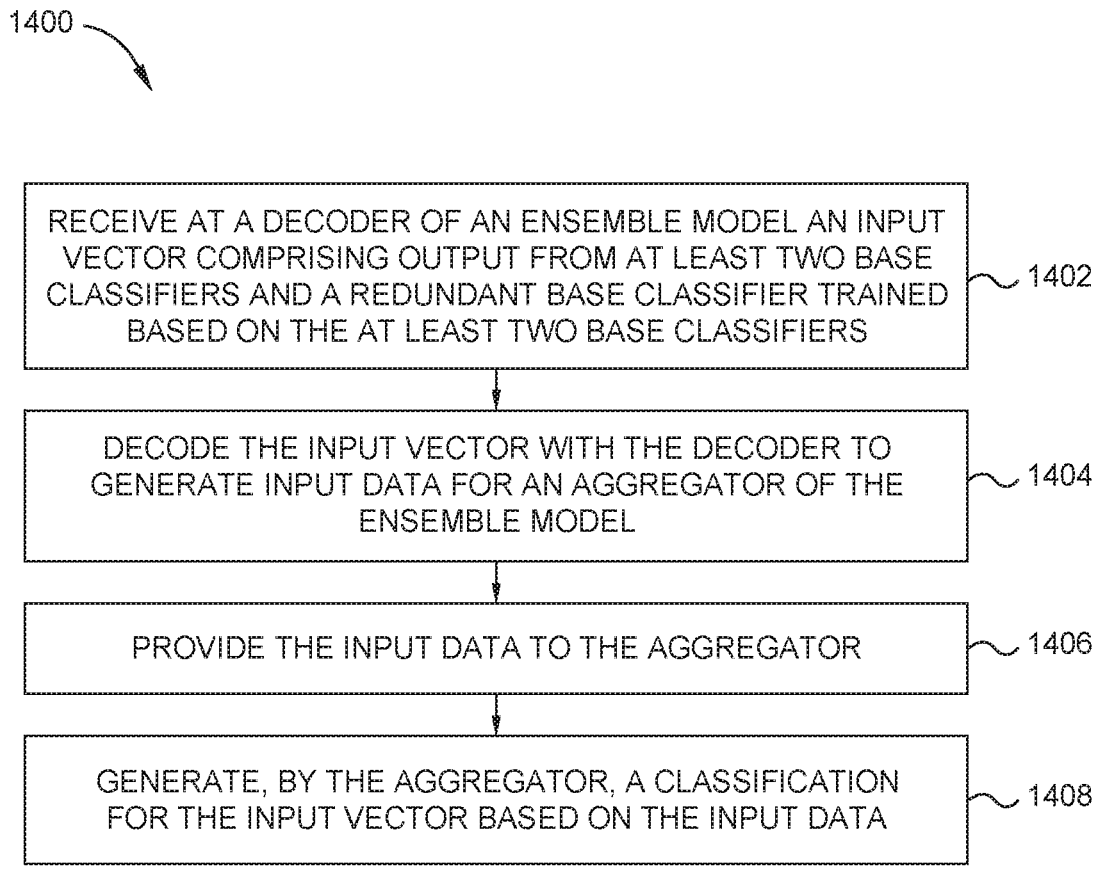
FIG. 14 depicts an example method for classifying with a machine learning model, in accordance with some embodiments of the present disclosure.

Example Method for Inferencing with an Ensemble Model Including Redundant Base Classifiers and a Decoder FIG. 14 depicts an example method 1400 for classifying with a machine learning model.

Method 1400 begins at step 1402 with receiving at a decoder of an ensemble model an input vector comprising output from a plurality of base classifiers and a redundant base classifier trained based on the plurality of base classifiers.

Method 1400 then proceeds to step 1404 with decoding the input vector with the decoder to generate input data for an aggregator of the ensemble model.

Method 1400 then proceeds to step 1406 with providing the input data to the aggregator.

Method 1400 then proceeds to step 1408 with generating, by the aggregator, a classification for the input vector based on the input data.

In some embodiments, method 1400 further includes generating a syndrome vector based on the input vector, wherein the syndrome vector is based on the concurrence of outputs from the at least two base classifiers and a redundant base classifier.

Example Processing System

Figure 15:
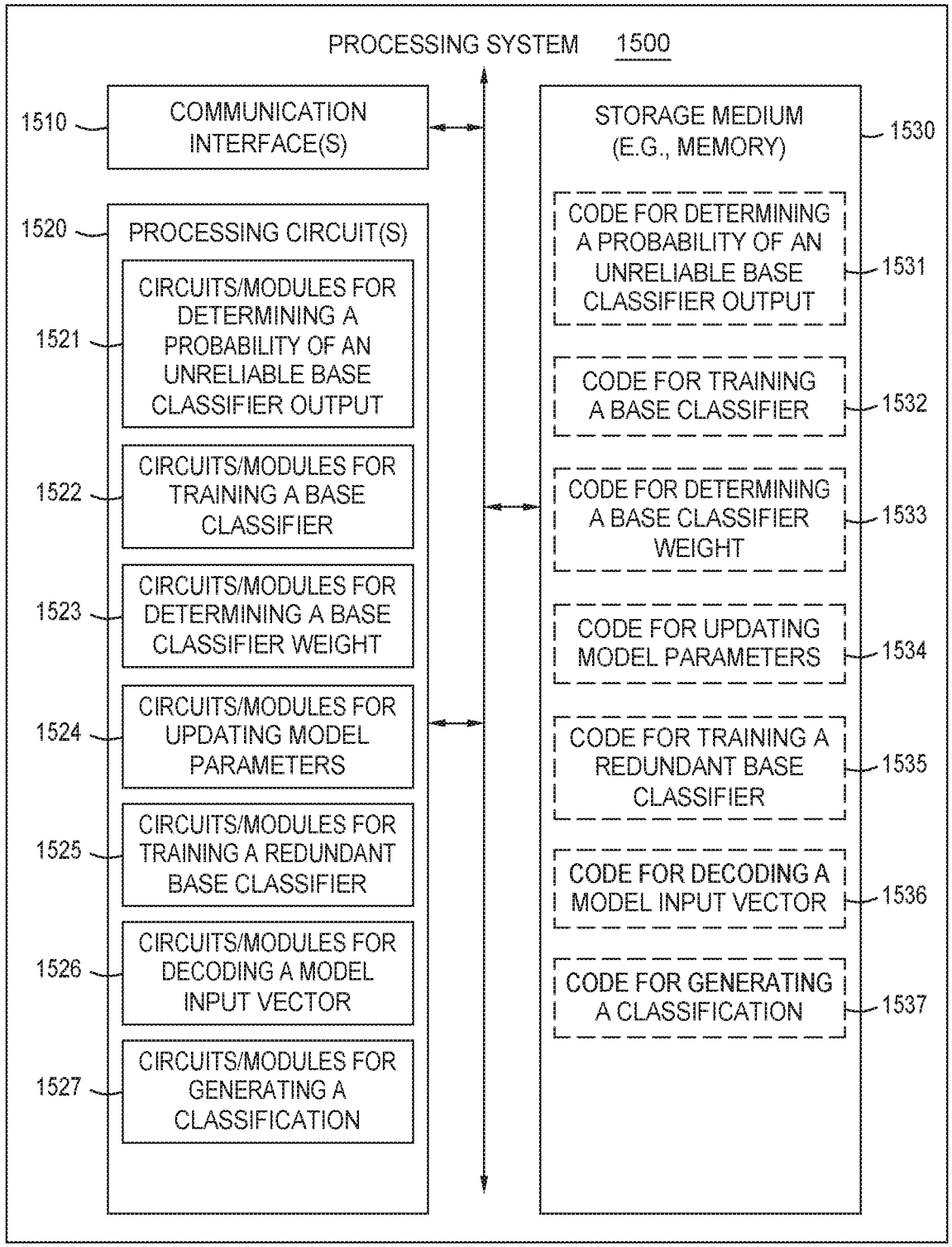
FIG. 15 depicts an example processing system, in accordance with some embodiments of the present disclosure.

FIG. 15 depicts an example processing system 1500, which may be configured to perform the various aspects described herein, including the methods described with respect to FIGS. 7, 8, and 12-14.

Processing system 1500, or components thereof, could embody or be implemented within a server computer, desktop computer, workstation, tablet computer, smartphone, smart wearable device, internet of things (IoT) device, edge processing device, personal digital assistant, digital camera, digital phone, entertainment device, medical device, self-driving vehicle control device, data storage device, controller device, host device, or some other type of device that processes data.

Processing system 1500 includes a communication interface(s) 1510, processing circuit(s) 1520 (e.g., at least one processor and/or other suitable circuitry), and storage medium 1530 (e.g., a non-volatile memory). These components can be coupled to and/or placed in electrical communication with one another via a signaling bus or other suitable component, represented generally by the connection lines in FIG. 15. The signaling bus may include any number of interconnecting buses and bridges depending on the specific application of the processing circuit(s) 1520 and the overall design constraints. The signaling bus links together various elements such that each of the communication interface 1510, the processing circuit(s) 1520, and the storage medium 1530 are coupled to and/or in electrical communication with each other. The signaling bus may also link various other circuits (not shown) such as timing sources, peripherals, voltage regulators, and power management circuits, which are well known in the art, and therefore, will not be described any further.

The communication interface 1510 provides a means for communicating with other devices or apparatuses over a transmission medium. In some implementations, the communication interface 1510 includes circuitry and/or programming (e.g., a program) adapted to facilitate the communication of information bi-directionally with respect to one or more devices in a system. In some implementations, the communication interface 1510 may be configured for wire-based communication. For example, the communication interface 1510 could be a bus interface, a send/receive interface, or some other type of signal interface including drivers, buffers, or other circuitry for outputting and/or obtaining signals (e.g., outputting signal from and/or receiving signals into an integrated circuit). The communication interface 1510 serves as one example of a means for receiving and/or a means for transmitting.

The storage medium 1530 may represent one or more computer-readable, machine-readable, and/or processor-readable devices for storing programming, such as processor executable code or instructions (e.g., software, firmware), electronic data, databases, or other digital information. The storage medium 1530 may also be used for storing data that is manipulated by the processing circuit(s) 1520 when executing programming. The storage medium 1530 may be any available media that can be accessed by a general purpose or special purpose processor, including portable or fixed storage devices, optical storage devices, and various other mediums capable of storing, containing or carrying programming.

By way of example and not limitation, the storage medium 1530 may include a magnetic storage device (e.g., hard disk, floppy disk, magnetic tape/strip), an optical disk (e.g., a compact disc (CD) or a digital versatile disc (DVD)), a smart card, a flash memory device (e.g., an SSD, a card, a stick, or a key drive), a RAM, ROM, PROM, EPROM, an EEPROM, MRAM, PCM, ReRAM, a register, a removable disk, and any other suitable medium for storing software and/or instructions that may be accessed and read by a computer. The storage medium 1530 may be embodied in an article of manufacture (e.g., a computer program product). By way of example, a computer program product may include a computer-readable medium in packaging materials. In view of the above, in some implementations, the storage medium 1530 may be a non-transitory (e.g., tangible) storage medium. For example, the storage medium 1530 may be a non-transitory computer-readable medium storing computer-executable code, including code to perform operations as described herein.

The storage medium 1530 may be coupled to the processing circuit(s) 1520 so that the processing circuit 1520 can read information from, and write information to, the storage medium 1530. That is, the storage medium 1530 can be coupled to the processing circuit(s) 1520 so that the storage medium 1530 is at least accessible by the processing circuit(s) 1520, including examples where at least one storage medium is integral to the processing circuit(s) 1520 and/or examples where at least one storage medium is separate from the processing circuit(s) 1520 (e.g., resident in the apparatus 1500, external to the apparatus 1500, distributed across multiple entities, etc.).

Programming stored by the storage medium 1530, when executed by the processing circuit(s) 1520, causes the processing circuit(s) 1520 to perform one or more of the various functions and/or process operations described herein. For example, the storage medium 1530 may include operations configured for regulating operations at one or more hardware blocks of the processing circuit(s) 1520, as well as to utilize the communication interface(s) 1510 for wireless communication utilizing their respective communication protocols.

At least some of the processing circuits described herein are generally adapted for processing, including the execution of such programming stored on a storage medium such as storage medium 1530. As used herein, the terms "code" or "programming" shall be construed broadly to include without limitation instructions, instruction sets, data, code, code segments, program code, programs, programming, subprograms, software modules, applications, software applications, software packages, routines, subroutines, objects, executables, threads of execution, procedures, functions, etc., whether referred to as software, firmware, middleware, microcode, hardware description language, or otherwise.

At least some of the processing circuits described herein are arranged to obtain, process and/or send data, control data access and storage, issue commands, and control other desired operations. For example, the processing circuits may include circuitry configured to implement desired programming provided by appropriate media in at least one example.

For example, the processing circuits may be implemented as one or more processors, one or more controllers, and/or other structure configured to execute executable programming. Examples of processing circuits may include a general purpose processor, a digital signal processor (DSP), an ASIC, a field programmable gate array (FPGA) or other programmable logic component, discrete gate or transistor logic, discrete hardware components, or any combination thereof designed to perform the functions described herein. A general purpose processor may include a microprocessor, as well as any conventional processor, controller, microcontroller, or state machine. The processing circuits may also be implemented as a combination of computing components, such as a combination of a controller and a microprocessor, a number of microprocessors, one or more microprocessors in conjunction with an ASIC and a microprocessor, or any other number of varying configurations. These examples of processing circuits are for illustration and other suitable configurations within the scope of the disclosure are also contemplated.

According to one or more aspects of the disclosure, the processing circuit(s) 1520 may be adapted to perform any or all of the features, processes, functions, operations and/or routines for any or all of the controller apparatuses described herein. For example, the processing circuit(s) 1520 may be configured to perform any of the steps, functions, and/or processes described with respect to FIGS. 7, 8, and 12-14. As used herein, the term "adapted" in relation to the processing circuit(s) 1520 may refer to the processing circuit(s) 1520 being one or more of configured, employed, implemented, and/or programmed to perform a particular process, function, operation and/or routine according to various features described herein. The processing circuit(s) 1520 may be a specialized processor, such as an ASIC that serves as a means for (e.g., structure for) carrying out any one of the operations described in conjunction with FIGS. 7, 8, and 12-14. The processing circuit(s) 1520 serves as one example of a means for processing. In various implementations, the processing circuit(s) 1520 may provide and/or incorporate, at least in part, the functionality described above for the computing system 200 of FIG. 2.

According to at least one example of the apparatus 1500, the processing circuit(s) 1520 may include one or more of: a circuit/module 1521 for determining a probability of an unreliable base classifier; a circuit/module 1522 for training a base classifier; a circuit/module 1523 for determining a base classifier weight; a circuit/module 1524 for updating model parameters; a circuit/module 1525 for training a redundant base classifier; a circuit/module 1526 for decoding a model input vector, and a circuit/module 1527 for generating a classification. Notably, these are just some examples, and others are possible based on the various aspects described herein.

As mentioned above, a program stored by the storage medium 1530, when executed by the processing circuit(s) 1520, causes the processing circuit(s) 1520 to perform one or more of the various functions and/or process operations described herein. For example, the program may cause the processing circuit(s) 1520 to perform and/or control the various functions, steps, and/or processes described herein with respect to FIGS. 7, 8, and 12-14.

As shown in FIG. 15, the storage medium 1530 may include one or more of: code 1531 for determining a probability of an unreliable base classifier; code 1532 for training a base classifier; code 1533 for determining a base classifier weight; code 1534 for updating model parameters; code 1535 for training a redundant base classifier; code 1536 for decoding a model input vector, and code 1537 for generating a classification. Notably, these are just some examples, and others are possible based on the various aspects described herein.

In at least some examples, the various circuits/modules in 1520 as well as other processing elements described herein may comprise means for performing the various functions described herein, including the functions enabled by the various codes stored in storage medium 1530.

ADDITIONAL CONSIDERATIONS

The various illustrative logical blocks and modules described in connection with the embodiments disclosed herein can be implemented or performed by a machine, such as a general purpose processor device, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A control processor can synthesize a model for an FPGA. For example, the control processor can synthesize a model for logical programmable gates to implement a tensor array and/or a pixel array. The control channel can synthesize a model to connect the tensor array and/or pixel array on an FPGA, a reconfigurable chip and/or die, and/or the like. A general-purpose processor device can be a microprocessor, but in the alternative, the processor device can be a controller, microcontroller, or state machine, combinations of the same, or the like. A processor device can include electrical circuitry configured to process computer-executable instructions. In another embodiment, a processor device includes an FPGA or other programmable device that performs logic operations without processing computer-executable instructions. A processor device can also be implemented as a combination of computing devices, e.g., a combination of a DSP and a microprocessor, a plurality of microprocessors, one or more microprocessors in conjunction with a DSP core, or any other such configuration. Although described herein primarily with respect to digital technology, a processor device may also include primarily analog components. For example, some or all of the algorithms described herein may be implemented in analog circuitry or mixed analog and digital circuitry. A computing environment can include any type of computer system, including, but not limited to, a computer system based on a microprocessor, a mainframe computer, a digital signal processor, a portable computing device, a device controller, or a computational engine within an appliance, to name a few.

The elements of a method, process, routine, or algorithm described in connection with the embodiments disclosed herein can be embodied directly in hardware, in a software module executed by a processor device, or in a combination of the two. A software module can reside in RAM memory, flash memory, ROM memory, EPROM memory, EEPROM memory, registers, hard disk, a removable disk, a CD-ROM, or any other form of a non-transitory computer-readable storage medium. An exemplary storage medium can be coupled to the processor device such that the processor device can read information from, and write information to, the storage medium. In the alternative, the storage medium can be integral to the processor device. The processor device and the storage medium can reside in an ASIC. The ASIC can reside in a user terminal. In the alternative, the processor device and the storage medium can reside as discrete components in a user terminal.

The herein described subject matter sometimes illustrates different components contained within, or connected with, different other components. It is to be understood that such depicted architectures are merely exemplary, and that in fact many other architectures can be implemented which achieve the same functionality. In a conceptual sense, any arrangement of components to achieve the same functionality is effectively "associated" such that the desired functionality is achieved. Hence, any two components herein combined to achieve a particular functionality can be seen as "associated with" each other such that the desired functionality is achieved, irrespective of architectures or intermedial components. Likewise, any two components so associated can also be viewed as being "operably connected," or "operably coupled," to each other to achieve the desired functionality, and any two components capable of being so associated can also be viewed as being "operably couplable," to each other to achieve the desired functionality. Specific examples of operably couplable include but are not limited to physically mateable and/or physically interacting components and/or wirelessly interactable and/or wirelessly interacting components and/or logically interacting and/or logically interactable components.

With respect to the use of substantially any plural and/or singular terms herein, those having skill in the art can translate from the plural to the singular and/or from the singular to the plural as is appropriate to the context and/or application. The various singular/plural permutations may be expressly set forth herein for sake of clarity.

It will be understood by those within the art that, in general, terms used herein, and especially in the appended claims (e.g., bodies of the appended claims) are generally intended as "open" terms (e.g., the term "including" should be interpreted as "including but not limited to," the term "having" should be interpreted as "having at least," the term "includes" should be interpreted as "includes but is not limited to," etc.). It will be further understood by those within the art that if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to inventions containing only one such recitation, even when the same claim includes the introductory phrases "one or more" or "at least one" and indefinite articles such as "a" or "an" (e.g., "a" and/or "an" should typically be interpreted to mean "at least one" or "one or more"); the same holds true for the use of definite articles used to introduce claim recitations. In addition, even if a specific number of an introduced claim recitation is explicitly recited, those skilled in the art will recognize that such recitation should typically be interpreted to mean at least the recited number (e.g., the bare recitation of "two recitations," without other modifiers, typically means at least two recitations, or two or more recitations). Furthermore, in those instances where a convention analogous to "at least one of A, B, and C, etc." is used, in general such a construction is intended in the sense one having skill in the art would understand the convention (e.g., "a system having at least one of A, B, and C" would include but not be limited to systems that have A alone, B alone, C alone, A and B together, A and C together, B and C together, and/or A, B, and C together, etc.). In those instances, where a convention analogous to "at least one of A, B, or C, etc." is used, in general such a construction is intended in the sense one having skill in the art would understand the convention (e.g., "a system having at least one of A, B, or C" would include but not be limited to systems that have A alone, B alone, C alone, A and B together, A and C together, B and C together, and/or A, B, and C together, etc.). It will be further understood by those within the art that virtually any disjunctive word and/or phrase presenting two or more alternative terms, whether in the description, claims, or drawings, should be understood to contemplate the possibilities of including one of the terms, either of the terms, or both terms. For example, the phrase "A or B" will be understood to include the possibilities of "A" or "B" or "A and B." Further, unless otherwise noted, the use of the words "approximate," "about," "around," "substantially," etc., mean plus or minus ten percent.

The foregoing description of illustrative embodiments has been presented for purposes of illustration and of description. It is not intended to be exhaustive or limiting with respect to the precise form disclosed, and modifications and variations are possible in light of the above teachings or may be acquired from practice of the disclosed embodiments. It is intended that the scope of the invention be defined by the claims appended hereto and their equivalents.

What is claimed is:

1. A method of training a machine learning model, comprising:
   determining a probability of an unreliable base classifier output for a plurality of base classifiers of an ensemble model, wherein the probability of an unreliable base classifier output is greater than a threshold value;
   training the plurality of base classifiers in a sequence of training iterations to minimize an expected loss function, wherein:
      each training iteration of the sequence of training iterations is associated with one base classifier of the plurality of base classifiers, and
      the expected loss function accounts for the probability of an unreliable base classifier output;
   determining a plurality of base classifier weights for the plurality of base classifiers, wherein each base classifier weight of the plurality of base classifier weights is associated with one base classifier of the plurality of base classifiers; and
   updating the ensemble model with the plurality of base classifier weights, wherein the expected loss function comprises an expected exponential loss function, wherein:
   the probability of an unreliable base classifier output $\eta$ comprises the probability of a straggling base classifier,
   the expected exponential loss function for each training iteration t is $\overline{E}=\Sigma_{i=1}^{n} w_t^{(t)} \cdot [(1-\eta)\mathrm{esp}\{-y_i\alpha_t h_t(x_i)\}+\eta]$,
   $w_i^{(t)}$ is a data point weight for data point $\{x_i, y_i\}$, and
   $\alpha_t$ is a base classifier weight of the plurality of base classifier weights associated with a base classifier $h_t$ of the plurality of base classifiers.

2. The method of claim 1, further comprising:
   determining an updated base classifier weight for a subset of base classifiers of the plurality of base classifiers, wherein each base classifier of the subset of base classifiers comprises a non-straggling base classifier.

3. The method of claim 1, further comprising: performing a classification with an aggregator of the ensemble model based on a non-straggling subset of base classifiers of the plurality of base classifiers.

4. The method of claim 3, wherein:
   the classification is performed according to:

$$\hat{y} = \mathrm{sign}\left(\sum_{\substack{t=1 \\ t \in A}}^{T} \alpha_t h_t(x)\right),$$

A is the non-straggling subset of base classifiers in the plurality of base classifiers T, and
$\alpha_t$ is a base classifier weight of the plurality of base classifier weights associated with a base classifier $h_t$ of the plurality of base classifiers.

5. A method of training a machine learning model, comprising:
   determining a probability of an unreliable base classifier output for a plurality of base classifiers of an ensemble model, wherein the probability of an unreliable base classifier output is greater than a threshold value;
   training the plurality of base classifiers in a sequence of training iterations to minimize an expected loss function, wherein:
      each training iteration of the sequence of training iterations is associated with one base classifier of the plurality of base classifiers, and
      the expected loss function accounts for the probability of an unreliable base classifier output;
   determining a plurality of base classifier weights for the plurality of base classifiers, wherein each base classifier weight of the plurality of base classifier weights is associated with one base classifier of the plurality of base classifiers; and
   updating the ensemble model with the plurality of base classifier weights, wherein the expected loss function comprises an expected exponential loss function, wherein:
   the probability of an unreliable base classifier output $\varepsilon$ comprises the probability of a flipping base classifier,
   the expected exponential loss function for each training iteration t is $\overline{E}=\Sigma_{i=1}^{m}\Pi_{j=1}^{t}[(1-\varepsilon)\exp\{-y_i\alpha_j h_j(x_i)\}+\varepsilon\exp\{y_i\alpha_j h_j(x_i)\}]$,
   $w_i^{(t)}$ is a data point weight for data point $x_i$, and
   $\alpha_t$ is a base classifier weight of the plurality of base classifier weights associated with a base classifier $h_t$ of the plurality of base classifiers.

6. A method of training a machine learning model, comprising:
   determining a probability of an unreliable base classifier output for a plurality of base classifiers of an ensemble model, wherein the probability of an unreliable base classifier output is greater than a threshold value;
   training the plurality of base classifiers in a sequence of training iterations to minimize an expected loss function, wherein:
      each training iteration of the sequence of training iterations is associated with one base classifier of the plurality of base classifiers, and
      the expected loss function accounts for the probability of an unreliable base classifier output;
   determining a plurality of base classifier weights for the plurality of base classifiers, wherein each base classifier weight of the plurality of base classifier weights is associated with one base classifier of the plurality of base classifiers; and
   updating the ensemble model with the plurality of base classifier weights, wherein determining the plurality of base classifier weights for the plurality of base classifiers, comprises: for each training iteration t, setting a base classifier weight $\alpha_t$ for a base classifier $h_t$ of the plurality of base classifiers according to:

$$\alpha_t = \frac{1}{2}\ln\left(\frac{\sum_{i=1}^{m} w_i^{(t)} I(h_t(x_i) = y_i)}{\sum_{i=1}^{m} w_i^{(t)} I(h_t(x_i) \neq y_i)}\right).$$

7. A method of training a machine learning model, comprising:
   determining a probability of an unreliable base classifier output for a plurality of base classifiers of an ensemble model, wherein the probability of an unreliable base classifier output is greater than a threshold value;

training the plurality of base classifiers in a sequence of training iterations to minimize an expected loss function, wherein:

each training iteration of the sequence of training iterations is associated with one base classifier of the plurality of base classifiers, and the expected loss function accounts for the probability of an unreliable base classifier output;

determining a plurality of base classifier weights for the plurality of base classifiers, wherein each base classifier weight of the plurality of base classifier weights is associated with one base classifier of the plurality of base classifiers; and updating the ensemble model with the plurality of base classifier weights, wherein determining the plurality of base classifier weights for the plurality of base classifiers, comprises: for each training iteration t, setting a base classifier weight $\alpha_t$ for a base classifier $h_t$ of the plurality of base classifiers according to:

$$\alpha_t = \frac{1}{2}\ln\left(\frac{\sum_{i=1}^m w_i^{(t)}[(1-\varepsilon)I(h_t(x_i) = y_i) + \varepsilon\, I(h_t(x_i) \neq y_i)]}{\sum_{i=1}^m w_i^{(t)}[(1-\varepsilon)I(h_t(x_i) \neq y_i) + \varepsilon\, I(h_t(x_i) = y_i)]}\right)$$

8. The method of claim 7, further comprising:

performing a classification with an aggregator of the ensemble model according to:

$$\hat{y} = \text{sign}\left(\sum_{\substack{t=1 \\ t \in A}}^T \alpha_t h_t(x) - \sum_{\substack{t=1 \\ t \notin A}}^T \alpha_t h_t(x)\right),$$

wherein A is a subset of non-flipping base classifiers in the plurality of base classifiers T.

9. A processing system configured to train a machine learning model, comprising:

a memory comprising computer-executable instructions;

one or more processors configured to execute the computer-executable instructions and cause the processing system to:

determine a probability of an unreliable base classifier output for a plurality of base classifiers of an ensemble model, wherein the probability of an unreliable base classifier output is greater than a threshold value;

train the plurality of base classifiers in a sequence of training iterations to minimize an expected loss function, wherein:

each training iteration of the sequence of training iterations is associated with one base classifier of the plurality of base classifiers, and the expected loss function accounts for the probability of an unreliable base classifier output;

determine a plurality of base classifier weights for the plurality of base classifiers, wherein each base classifier weight of the plurality of base classifier weights is associated with one base classifier of the plurality of base classifiers; and update the ensemble model with the plurality of base classifier weights, wherein determining the plurality of base classifier weights for the plurality of base classifiers, comprises: for each training iteration t, setting a base classifier weight $\alpha_t$ for a base classifier $h_t$ of the plurality of base classifiers according to:

$$\alpha_t = \frac{1}{2}\ln\left(\frac{\sum_{i=1}^m w_i^{(t)} I(h_t(x_i) = y_i)}{\sum_{i=1}^m w_i^{(t)} I(h_t(x_i) \neq y_i)}\right).$$

10. The processing system of claim 9, wherein the expected loss function comprises an expected exponential loss function.

11. The processing system of claim 9, wherein the one or more processors are further configured to cause the processing system to:

determine an updated base classifier weight for a subset of base classifiers of the plurality of base classifiers, wherein each base classifier of the subset of base classifiers comprises a non-straggling base classifier.

12. The processing system of claim 11, wherein the one or more processors are further configured to cause the processing system to: train the plurality of base classifiers of an ensemble model in a sequence of training iterations to minimize the expected loss function.

13. The processing system of claim 12, wherein each training iteration of the sequence of training iterations is associated with one base classifier of the plurality of base classifiers.

14. The processing system of claim 13, wherein each base classifier weight of the plurality of base classifier weights is associated with one base classifier of the plurality of base classifiers.

15. The processing system of claim 11, wherein the one or more processors are further configured to cause the processing system to: train a plurality of redundant base classifiers of the ensemble model based on a plurality of trained base classifiers.

16. The processing system of claim 15, wherein the one or more processors are further configured to cause the processing system to: determine a plurality of redundant base classifier weights for the plurality of redundant base classifiers.

17. The processing system of claim 16, wherein each redundant base classifier weight of the plurality of redundant base classifier weights is associated with one redundant base classifier of the plurality of redundant base classifiers.

18. The processing system of claim 17, wherein the one or more processors are further configured to cause the processing system to: update the ensemble model with the plurality of base classifier weights and the plurality of redundant base classifier weights.

19. The processing system of claim 18, each redundant base classifier of the plurality of redundant base classifiers is trained based on a unique set of two base classifiers of the plurality of base classifiers to form a triple of classifiers.

20. The processing system of claim 9, wherein the one or more processors are further configured to cause the processing system to: perform a classification with an aggregator of the ensemble model based on a non-straggling subset of base classifiers of the plurality of base classifiers.

21. The processing system of claim 9, wherein the one or more processors are further configured to cause the processing system to: determine the probability of a straggling base classifier.

22. The processing system of claim 9, wherein the one or more processors are further configured to cause the processing system to: determine the probability of a flipping base classifier.

23. The processing system of claim 9, wherein the one or more processors are further configured to cause the processing system to: synthesize a model for logical programmable gates to implement a tensor array.

24. The processing system of claim 9, wherein the one or more processors are further configured synthesize a model for logical programmable gates to implement a tensor array.

\* \* \* \* \*